United States Patent [19]
King et al.

[11] Patent Number: 6,011,951
[45] Date of Patent: *Jan. 4, 2000

[54] TECHNIQUE FOR SHARING RADIO FREQUENCY SPECTRUM IN MULTIPLE SATELLITE COMMUNICATION SYSTEMS

[75] Inventors: Janet L. King, Redmond; Richard C. Deininger, Edmonds; Kenneth C. Grzemski, Woodinville; Thomas L. Hayden, Issaquah, all of Wash.; Mark A. Sturza, Encino, Calif.

[73] Assignee: Teledesic LLC, Bellevue, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,122

[22] Filed: Aug. 22, 1997

[51] Int. Cl.$^7$ ........................................... H04B 7/19
[52] U.S. Cl. ............................................... 455/13.2
[58] Field of Search .................. 455/12.1, 13.1, 455/13.2, 456, 25; 340/991

[56] References Cited

U.S. PATENT DOCUMENTS

| | | | |
|---|---|---|---|
| 4,189,675 | 2/1980 | Reilly et al. | 455/13.2 |
| 5,268,694 | 12/1993 | Jan et al. | 342/354 |
| 5,448,621 | 9/1995 | Knudsen | 379/58 |
| 5,551,058 | 8/1996 | Hutcheson et al. | 455/33.2 |
| 5,625,867 | 4/1997 | Rouffet et al. | 455/13.1 |
| 5,655,217 | 8/1997 | Lemson | 455/513 |
| 5,758,261 | 5/1998 | Wiedeman | 455/13.1 |
| 5,805,633 | 9/1998 | Uddenfeldt | 375/202 |

*Primary Examiner*—William Cumming
*Attorney, Agent, or Firm*—Seed and Berry LLP

[57] ABSTRACT

A technique for sharing radio frequency spectrum between multiple satellite communication systems. A first and a second satellite communication system each contain a plurality of satellites in a plurality of non-geostationary (non-GSO) Earth orbits. Each of the plurality of non-GSOs has a predefined orbital plane. Within each orbital plane, satellites of the first and second satellite communication systems are alternating, such that each orbital plane contains satellites from each of the satellite systems. In this manner, it is possible to achieve satisfactory discrimination between satellites and Earth-based stations. The Earth-based station of each communication system will communicate with the closest satellite of its respective communication system. In an alternative technique that is particularly useful when an Earth-based station in the first communication system is able to communicate with more than one satellite, a satellite is selected based on the topocentric separation of the satellite from satellites in the second system. The system can also combine alternating satellites within an orbital plane with alternating orbital planes with satellites of each respective communication system.

42 Claims, 18 Drawing Sheets

TECHNIQUE FOR SHARING RADIO FREQUENCY SPECTRUM IN MULTIPLE SATELLITE COMMUNICATION SYSTEMS

TECHNICAL FIELD

The present invention is related generally to satellite communication systems and, more specifically, to a technique for sharing radio frequency spectrum in multiple satellite communication systems.

BACKGROUND OF THE INVENTION

Satellites provide a vital communication link for radio, telephone and television traffic in addition to other forms of data communication. Satellite communication systems are useful alternatives to conventional terrestrial communication systems, such as land lines, fiber optic, microwave, and the like.

One example of satellite communication, well-known in the industry, employs communication satellites in geosynchronous orbit around the Earth. Such geosynchronous orbits require the insertion of satellites at a location approximately 22,300 miles from Earth near the equator. In this location, a satellite orbits the Earth at a velocity that matches the Earth's rotational velocity. Thus, a geosynchronous satellite remains in a substantially fixed position relative to the Earth's surface.

Geosynchronous satellites have the advantage of being in a fixed position relative to the surface of the Earth. However, geosynchronous satellites are extremely expensive due to the high cost of insertion into a geosynchronous orbit. Furthermore, Earth-based stations communicating with a geosynchronous satellite require high power transmission levels to effectively communicate with a satellite 22,300 miles away. In addition, the satellite itself must have a high power transmitter to effectively communicate with Earth-based receivers. Transmission delays, due to the time required for radio signals to propagate up to a satellite and back to Earth, are also a significant problem with geosynchronous satellite systems.

A significant advantage of geosynchronous satellites is the ability to position satellites far enough from each other in a geosynchronous orbit so as to permit Earth-based antenna systems to discriminate between the various satellites. For example, an antenna on an Earth-based station can be positioned so as to communicate with a particular geosynchronous satellite while minimizing interference to and from adjacent satellites in geosynchronous orbit. This is especially important when geosynchronous satellites share a common portion of the radio frequency spectrum.

To overcome the disadvantages of transmission delay associated with communications using a geosynchronous satellite communication system, a series of low-Earth orbit (LEO) satellites may be inserted into non-geostationary orbits. Such LEO satellites suffer from the disadvantage that they are not in a fixed location with respect to the Earth's surface. However, LEO satellites offer the advantage of low transmission delay. Satellite systems, whether using geosynchronous satellites or LEO satellites, must effectively use the radio frequency spectrum assigned to the communication system.

With a low-Earth orbit, the satellites move relative to the Earth, and relative to each other. This creates potential radio frequency interference problems when additional communications systems that are also in low-Earth orbit are expected to share the same radio frequency spectrum.

Therefore, it can be appreciated that there is a significant need for a system and method for sharing radio frequency spectrum among LEO satellite communication systems. The present invention provides this and other advantages as will be apparent from the following description and accompanying figures.

SUMMARY OF THE INVENTION

The present invention is embodied in a system and method for minimizing interference in satellite communication systems. The system permits the sharing of radio frequency spectrum between first and second satellite communication systems, and comprises a first Earth-based communication station operating as an Earth-bound portion of the first satellite communication system and a second Earth-based communication station operating as an Earth-bound portion of the second satellite communication system. The system also includes first and second satellites in a non-geostationary Earth orbit operating as a satellite portion of the first satellite communication system to communicate with the first Earth-based communication station. The first and second satellites are positioned in an Earth orbit in a first predetermined plane. The system further includes a third satellite in a non-geostationary Earth orbit operating as a satellite portion of the second satellite communication system to communicate with the second Earth-based communication station. The third satellite is also positioned in an Earth orbit in the first predetermined plane and is located intermediate the first and second satellites in the first predetermined plane whereby interference between the first and second satellite communication systems is minimized by interleaving the first, second and third satellites in the non-geostationary Earth orbit.

The present invention is applicable to any non-geostationary Earth orbit, but may preferably be used for satellites in low-Earth orbits. In an exemplary embodiment, the first predetermined plane is inclined at substantially 90° with respect to the Earth's equator, whereby the first, second and third satellites are in a near-polar orbit.

The first and second satellite communication systems may be portions of a common communication system with the first, second and third satellites being portions of the common communication system. The first and second Earth-based communication stations may be located at substantially the same location on the surface of the Earth. Alternatively, the satellites communicate with first and second Earth-based communication stations at different locations on the surface of the Earth.

The satellites each include a directional antenna. The first antenna, coupled to the first satellite, is oriented to direct radio beams between the first satellite and the first Earth-based communication system, and thus minimize radio interference with the second Earth-based communication station. The system also includes a first directional antenna coupled to the first Earth-based communication station. The antenna coupled to the first Earth-based communication station is oriented to direct, i.e., broadcast/transmit radio beams between the first Earth-based communication station and the first satellite, and thus minimize radio interference with the third satellite.

The system may further include a fourth satellite in a non-geostationary Earth orbit operating as part of the satellite portion of the first satellite communication system to communicate with the first Earth-based communication station. The fourth satellite is positioned in an Earth orbit in a second predetermined plane different from the first predetermined plane. The system includes selection means for selecting one of the first or fourth satellites for communication with the first Earth-based station. The selection means selects the first or fourth satellite based on a selection criteria that ensures a minimum amount of interference with the second satellite communication system. For example, the selection means may select the first or fourth satellite for communication with the first Earth-based communication station based on a topocentric separation between the first and fourth satellites and a topocentric separation between the third and fourth satellites. In a preferred embodiment, the selection means selects one of the first and fourth satellites having a greater topocentric separation from the third satellite. Radio frequency interference may be reduced by selecting the satellite having the greater topocentric separation from the third satellite. Other alternative selection criteria may also be used to determine which satellite to select, as long as an unacceptable level of interference does not result between the first and second satellite communication systems.

DETAILED DESCRIPTION OF THE INVENTION

Satellite communication systems in geosynchronous orbit have a fixed relationship with respect to Earth and with respect to other satellites in geosynchronous orbit. By placing satellites in appropriate positions within a geosynchronous orbit, it is possible to space satellites sufficiently far apart such that antenna discrimination is sufficient to reduce interference between satellites and Earth-based stations to an acceptable level. Thus, geosynchronous satellite systems may readily share the same radio frequency (RF) spectrum. However, geosynchronous satellite systems suffer from serious delays in transmission due to an orbital position approximately 22,300 miles from Earth.

Figure 1A:
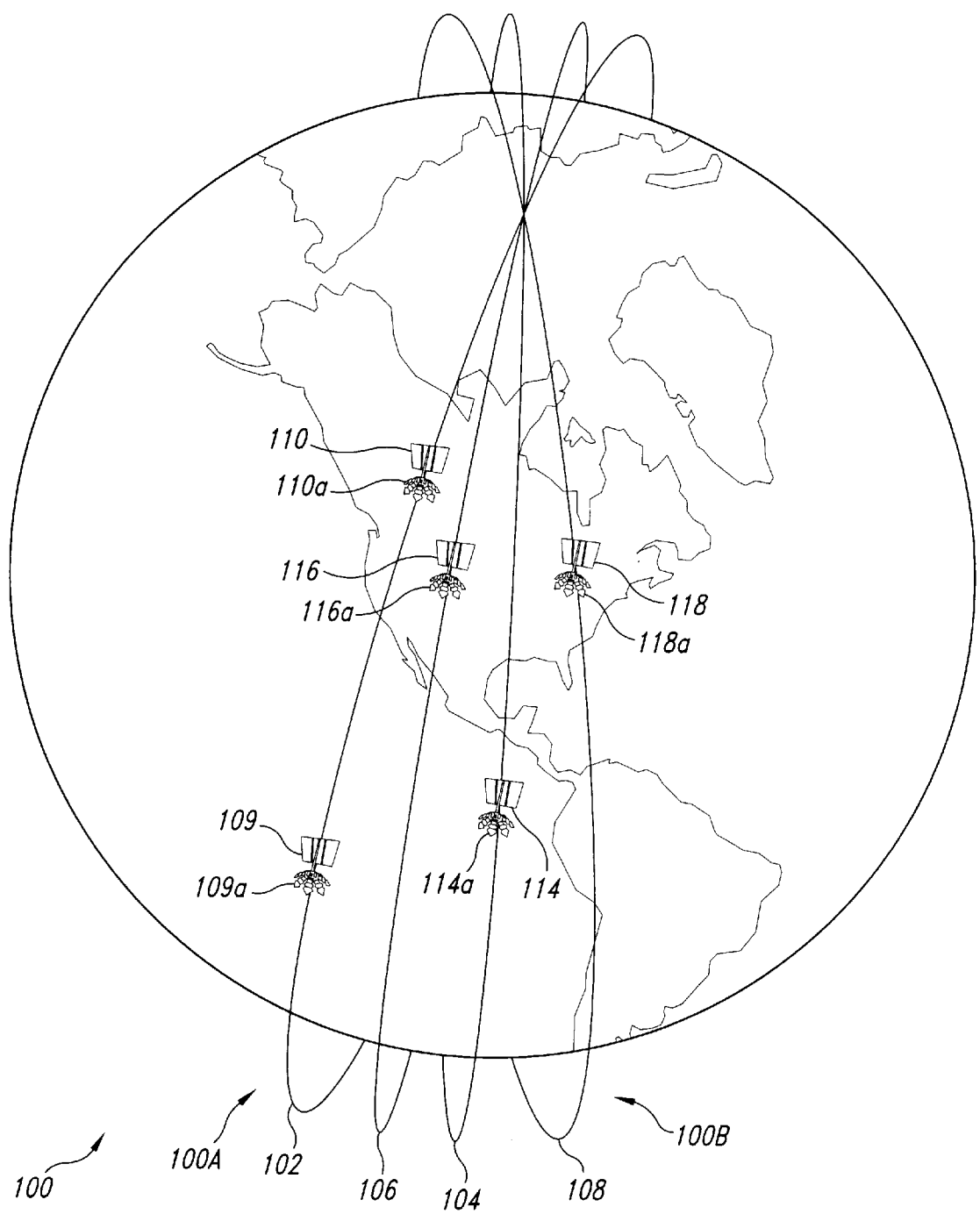
FIG. 1A illustrates the Earth and four near polar low-Earth orbital planes containing orbiting satellites.

While low-Earth orbit (LEO) satellite systems have much lower delay times than geosynchronous satellite systems, the satellites in LEO systems are not fixed with respect to the Earth or with respect to other satellites in different orbital planes of the system. The present invention provides techniques to allow co-frequency operation of two LEO satellite systems by interleaving the orbits of the satellites of one communication system with satellites of a second satellite system. FIG. 1A illustrates the operation of two satellite systems in which satellites are placed in near polar orbital planes. For the sake of clarity, only four adjacent orbital planes are illustrated in FIG. 1A. To minimize interference between satellite communication systems, the orbital planes of a first satellite communication system 100A are interleaved between the orbital planes of a second satellite communication system 100B. For example, FIG. 1A illustrates orbital planes 102 and 104, which form part of the first satellite communication system 100A. FIG. 1A also illustrates orbital planes 106 and 108, which form part of the second satellite communication system 100B. The satellite communication systems 100A and 100B may collectively be referred to herein as a system 100. The orbital planes of the first satellite communication system 100A are interleaved with the orbital planes of the second satellite communication system 100B. Thus, the orbital plane 106, which contains satellites of the second satellite communication system 100B, is interleaved between the orbital planes 102 and 104 which contain satellites of the first satellite communication system 100A. Similarly, the orbital plane 104, which contains satellites of the first satellite communication system 100A, is interleaved between the orbital planes 106 and 108 which contain satellites of the second satellite communication system 100B.

In a conventional LEO non-geostationary orbit, or non-GSO satellite system, each orbital plane contains a large number of orbiting satellites each having a multi-element directional antenna array such as described in U.S. Pat. No. 5,527,001, which is assigned to the assignee of the present invention and which is incorporated by reference in its entirety. Again, for the sake of clarity, FIG. 1A illustrates only a few of the plurality of satellites in each of the orbital planes 102 to 108. For example, a satellite 109 with antenna 109a and a satellite 110 with antenna 110a are both orbiting the Earth in the orbital plane 102. A satellite 114 with antenna 114a is orbiting the Earth in the orbital plane 104. The satellites 109, 110 and 114 are all portions of the first satellite communication system 100A. A satellite 116 and antenna 116a, which is a portion of the second satellite communication system 100B, is orbiting the Earth in the orbital plane 106, which is intermediate orbital planes 102 and 104 of the first satellite communication system 100A. A satellite 118 and antenna 118a, also a portion of the second satellite communication system 100B, is orbiting the Earth in the orbital plane 108.

By appropriate interleaving of the orbital planes of the systems 100A and 100B, a high degree of RF spectrum sharing between the first and second satellite communication systems 100A and 100B can be achieved while minimizing interference between the systems. The present invention uses a combination of interleaving and satellite selection to minimize interference between the first and second satellite communication systems 100A and 100B.

The satellites in orbital planes 102 and 104 are portions of a first non-GSO network of a fixed satellite service (FSS). In an exemplary embodiment, the first non-GSO FSS network is designated herein as a low-Earth orbit (LEO) SAT-1A system. The satellites in the orbital planes 106 and 108 are part of a second non-GSO FSS network, designated herein as a LEO SAT-1B system. The satellite systems LEO SAT-1A and LEO SAT-1B share similar characteristics and are both intended to operate in a 500 megahertz (MHz) bandwidth in the 18.8–19.3 and 28.6–29.1 gigahertz (GHz) frequency ranges. These frequency ranges are in the frequency band from 17 to 30 GHz commonly referred to as the Ka-band. However, the principles of the present invention are applicable to any non-GSO satellite system and are not limited to any frequency range.

A brief discussion of the satellite systems will assist in a greater understanding of the interleaving process used in the present invention. The LEO SAT-1A system is an example of a non-GSO FSS network designed to provide global communications to a large number of small Earth-based stations. The LEO SAT-1A system is designed to use a constellation of hundreds of operational interlinked LEO satellites. In one embodiment, the second non-GSO FSS network, LEO SAT-1B, is identical to the LEO SAT-1A system, except that the orbital planes of the LEO SAT-1B system are interleaved half way between the orbital planes of the LEO SAT-1A system. This is illustrated in FIG. 1A where the orbital planes 102 and 104 are orbital planes of satellites in the LEO SAT-1A system while the interleaved orbital plane 106 is an orbital plane of satellites in the LEO SAT-1B system. However, the first and second systems LEO SAT-1A and LEO SAT-1B need not be identical to permit co-frequency operation of the first and second systems.

Table 1 below illustrates operational parameters of the LEO SAT-1A and LEO SAT-1B systems.

TABLE 1

| LEO SAT-1A and LEO SAT-1B Network Orbital Parameters | |
|---|---|
| No. of Planes | 20 |
| No. of Satellites Per Plane | 40 |
| Satellite Phasing Between Planes | random |
| Altitude | 700 km |
| Inclination | ~90.0° |

Each of the satellite systems LEO SAT-1A and LEO SAT-1B comprise a constellation of 800 operational LEO satellites. Each of the satellite constellations are organized into 20 circular orbital planes. Each of the orbital planes is designed to contain 40 satellites, and may contain additional "spare" satellites. The interleaving of orbital planes requires a minimum of three orbital planes. However, if the goal of the non-GSO satellite system is to provide global coverage, the number of orbital planes and the number of satellites in each orbital plane is dependent on the orbital altitudes. For example, the LEO non-GSO system described herein requires at least six orbital planes, and typically includes 20 orbital planes. That is, the LEO SAT-1A and LEO SAT-1B satellite systems each use 20 orbital planes. In an exemplary embodiment, each orbital plane contains an equal number of satellites. In contrast, a medium Earth orbit non-GSO satellite system requires fewer orbital planes and fewer satellites in each orbital plane to provide global coverage. The present invention is intended to encompass interleaving of orbital planes in any non-GSO satellite system.

The orbits of the satellite system are described above as circular orbits with orbital altitudes of approximately 700 km. However, those of ordinary skill in the art can readily appreciate that orbital perturbations may be caused by a number of factors. For example, it is known that the Earth is not perfectly spherical, but is an oblate spheroid that is flatter at the poles and bulges at the equator. The non-spherical shape of the Earth causes perturbations in the orbits of the LEO satellite systems 100A and 100B, resulting in a precession of the orbital planes with respect to an inertial reference frame at a rate which is a function of inclination and altitude. The gravitational effects of third bodies, notably the sun and moon, also have an effect on the orbits of the LEO satellite systems 100A and 100B which also induces a precession of the orbital plane at a rate proportional to altitude, inclination and right ascension of the ascending node. As is known to those of ordinary skill in the art, the amount of gravitational effect, referred to as "lunisolar perturbations" depend on the orbital inclination, altitude and right ascension of the ascending node for the plane of satellites. Orbital perturbations caused by the non-spherical shape of the Earth and by third bodies are well-known in the art and need not be described in detail herein. For example, a discussion of orbital mechanics and orbital perturbations may be found in "Space Mission Analysis In Design," edited by James R. Wertz and Wiley J. Larson, Kluwer Academic Publishers and "Communications Satellite Handbook," by Walter L. Morgan and Gary D. Gordon, John Wiley and Sons (1989). Thus, the orbits will not be perfectly circular.

Each of the orbital planes has an inclination, i, of approximately 90°, thus creating a substantially polar constellation. As can be appreciated, the deployment of hundreds of satellites in polar orbits would result in the collision of satellites at the north or south poles where the polar orbits cross. To avoid such collisions, the system 100 utilizes near polar orbits at staggered altitudes. As is known in the art, slight changes in the altitude of the near polar orbital planes requires that the satellites be placed in orbit at slightly different inclinations in order to maintain a substantially equal rate of plane precession for each of the satellites of the system 100. In an exemplary embodiment, the system 100 staggers the altitude of the orbital planes in approximately 2 kilometer increments such that the twenty orbital planes discussed above at predefined orbital altitudes of approximately 700 km±20 km. By choosing the appropriate orbital altitude, the rate of orbital plane precession of the satellites of the system 100 can be fixed with respect to each other.

The orbital planes have a right ascension of the ascending node, $\Omega$, in 9° increments. Thus, in the example of FIG. 1A, the orbital plane 102 is separated from the orbital plane 104 by 9° right ascension at the ascending node. The orbital plane 106 is interleaved half way between the orbital planes 102 and 104. The orbital plane 106 is also separated from the orbital plane 108 by 9° right ascension at the ascending node. The satellites in adjacent orbital planes travel in the same direction except at the constellation "seams," where ascending and descending satellites travel next to each other. For example, a first orbital plane may be defined with the right ascension of the ascending node $\Omega=0°$. Seams in the constellation occur at a final orbital plane (i.e., $\Omega=171°$) in the constellation where satellites in the final orbital plane are moving in the opposite direction to satellites in the first orbital plane (i.e., $\Omega=0°$).

For purposes of the present analysis, the position of a satellite within one orbital plane is considered to be independent of the positions of the satellites within any other orbital plane, and thus are considered to have a random phasing, as indicated in Table 1. It should be understood that the satellites themselves do not move randomly, but travel in a predetermined orbital pattern at fixed distances from other satellites within the same orbital plane. Thus, in an exemplary embodiment, satellites within a given orbital plane have substantially the same altitude and travel at substantially the same velocity in substantially identical orbits. However, each orbital plane may contain spare satellites as described above. If a spare satellite is used, the relative position of the satellites in adjacent planes is altered. Therefore, the analysis of the systems 100A and 100B assumes random phasing between satellites of adjacent orbital planes.

Figure 1B:
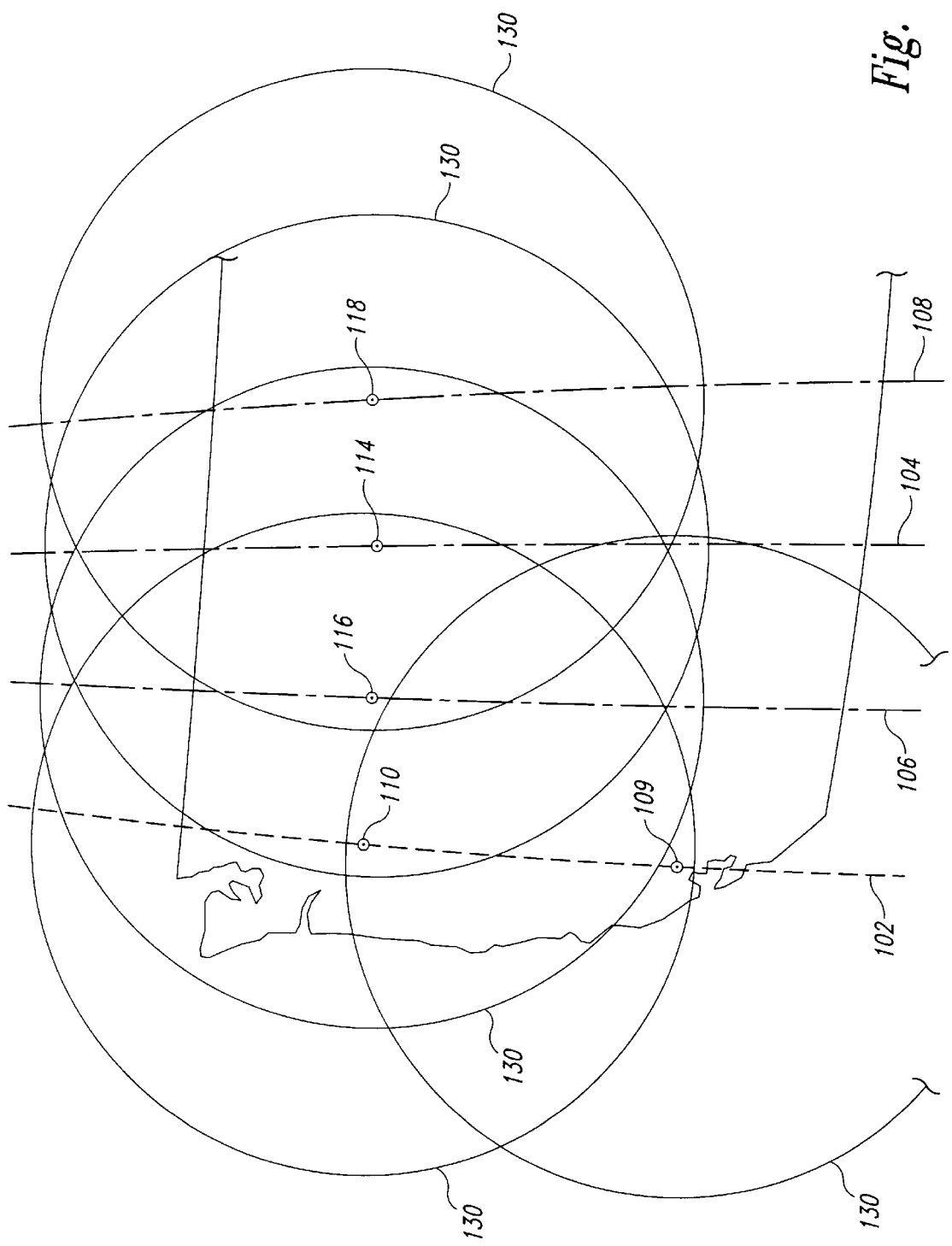
FIG. 1B illustrates overlapping satellite footprints for satellites in the four low-Earth orbit planes of FIG. 1A.

FIG. 1B depicts the orbital planes 102 to 108 as they pass over a portion of the continental United States. The antenna of each satellite is designed to provide a nearly circular footprint 130 on the surface of the Earth. The satellite antenna may be of a known design, such as described in U.S. Pat. No. 5,548,294, assigned to the assignee of the present invention, and which is incorporated by reference in its entirety. As illustrated in FIG. 1B, there are overlapping areas of coverage from the circular footprints 130 of adjacent satellites in a particular orbital plane, as well as overlapping areas of coverage with the footprints of satellites in adjacent planes. For example, the footprint 130 generated by the antenna 109a (see FIG. 1A) of the satellite 109 overlaps with the footprint 130 generated by the antenna 110a of the satellite 110. Similarly, there is overlap in the footprint generated by the antenna 110a and the footprint 130 generated by the antenna 116a of the satellite 116. The satellites within a particular orbital plane are spaced at substantially equidistant locations along the orbital plane. Thus, the overlap of the footprint 130 from satellites within a particular plane is relatively constant. However, the amount of overlap of the footprint 130 from satellites in adjacent orbital planes increases as the latitude increases. This is caused by the convergence of the orbital planes near the north and south poles. As best seen in FIG. 1A, the orbital planes 102 and 106 converge as the latitude increases, thus causing an increased overlap of the footprints 130 of satellites within one orbital plane with the footprints of satellites in the other orbital plane.

Figure 1C:
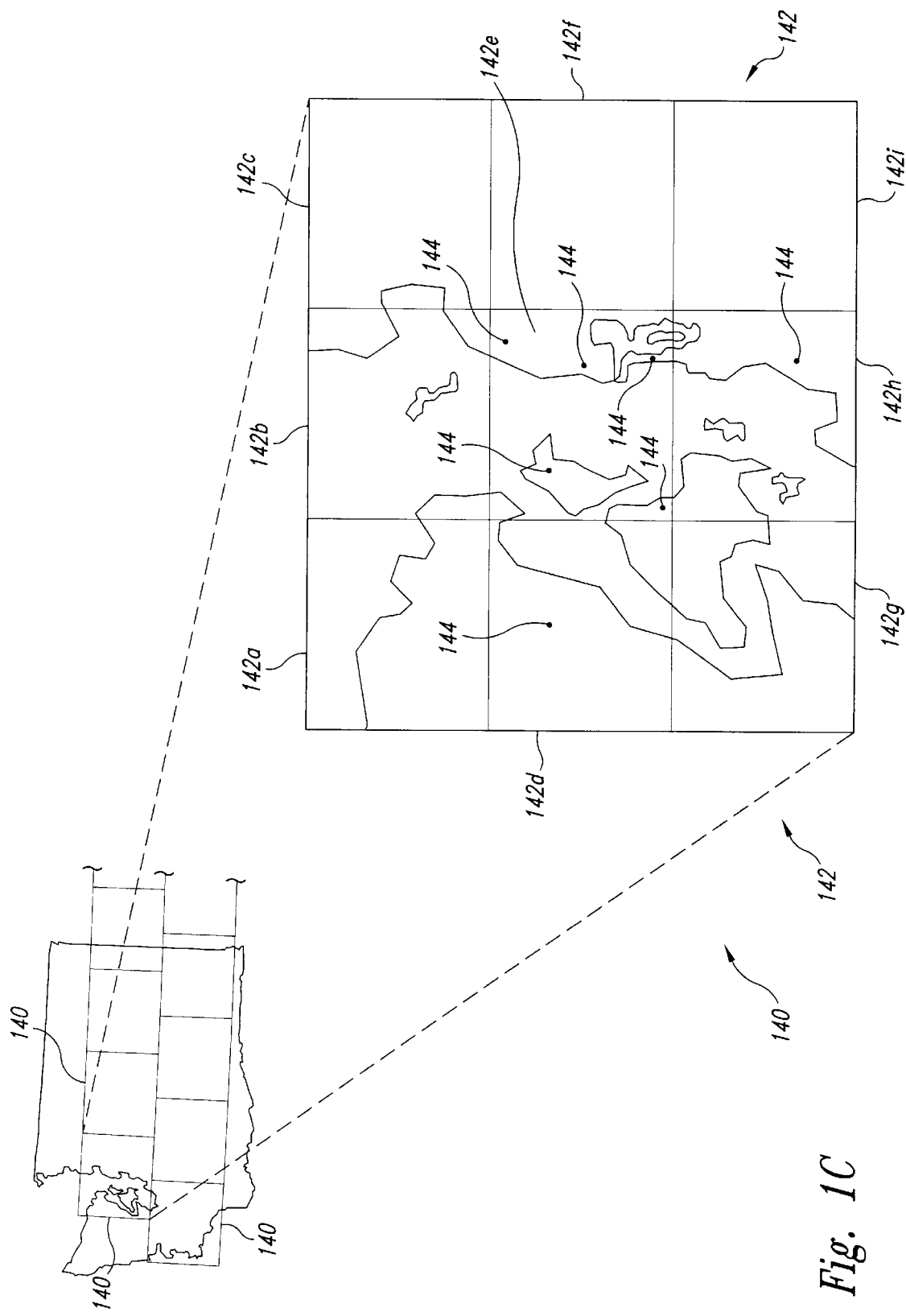
FIG. 1C illustrates the apportionment of the Earth's surface into a plurality of Earth-fixed cells.

In a preferred embodiment, the satellite systems LEO SAT-1A and LEO SAT-1B provide continuous communications with a plurality of Earth-fixed cells. The two non-GSO FSS network systems LEO SAT-1A and LEO SAT-1B use a combination of space, time and frequency division multiple access techniques to control communications between satellites and Earth-based stations. The Earth's surface is mapped into a fixed grid of approximately 20,000 super-cells using bands of latitude as described in U.S. Pat. No. 5,408,237, which is assigned to the assignee of the present invention, and which is incorporated by reference in its entirety. As illustrated in FIG. 1C, a plurality of super-cells 140 are defined to cover the state of Washington. The super-cell 140 is square in shape and 160 kilometers on each side. At any instant in time, each Earth-fixed super-cell 140 is served by one transmit beam and one receive beam from the nearest satellite. Each super-cell 140 comprises nine generally square cells 142, each identified by reference numbers 142a–i in FIG. 1C, which are 53.3 kilometers on each side. A variable number of Earth-based stations 144 are located within the cells 142. As can be appreciated, some cells 142 may contain no Earth-based stations, while other cells contain a large number of Earth-based stations. The number of simultaneously active Earth-based stations 144 in a given cell 142 is limited by the bandwidth requirements of the Earth-based stations.

Figure 2A:
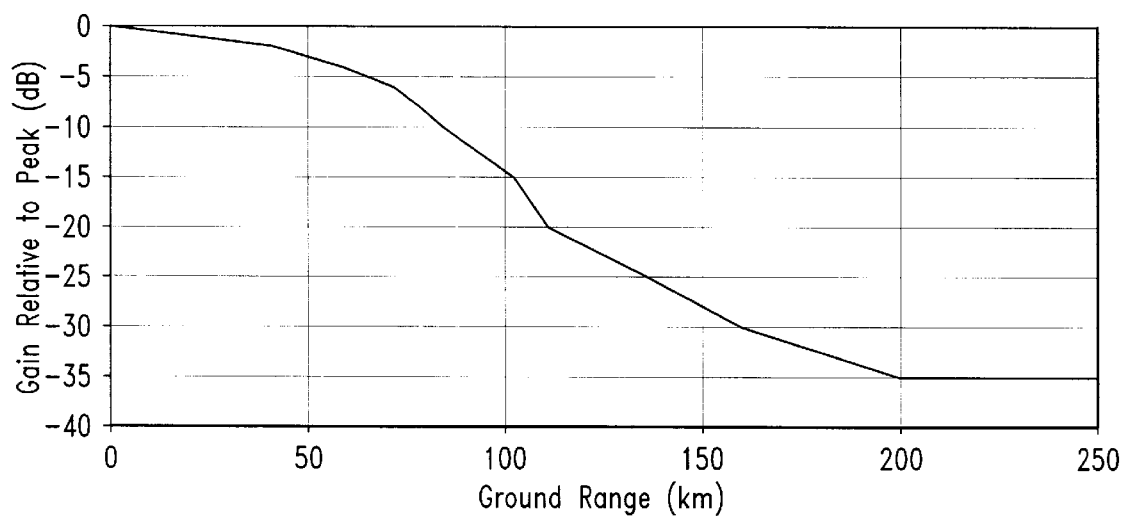
FIG. 2A is a graph of an antenna gain pattern of transmit and receive antennas on a non-geostationary orbit satellite of the present invention.

FIG. 2A illustrates the antenna gain pattern for satellites of the two non-GSO FSS network systems LEO SAT-1A and LEO SAT-1B. The antenna gain pattern is a function of ground range from the antenna boresight of the antenna on the Earth-based station. As is known in the art, ground range refers to the distance from the antenna of the Earth-based station from the point on the Earth's surface at which the satellite antenna is aimed. FIG. 2A illustrates the gain of the satellite antenna (e.g., the antenna 110a) relative to the peak gain of the antenna as a function of ground range and illustrates the decrease in antenna gain as the ground range increases. It should be noted that the gain of the satellite antenna relative to the peak gain is shown in FIG. 2A in decibels (dB). The peak gain of the satellite antenna varies from 29.8 dBi to 32 dBi to provide at least partial compensation for path loss due to variations in the slant range to the location of the Earth-based station where dBi is referenced to the power of an isotropic radiator, and slant range is defined as the actual distance between the satellite and the Earth-based station. The antenna gain pattern in FIG. 2A is the same for satellite transmit and receive antennas.

Figure 2B:
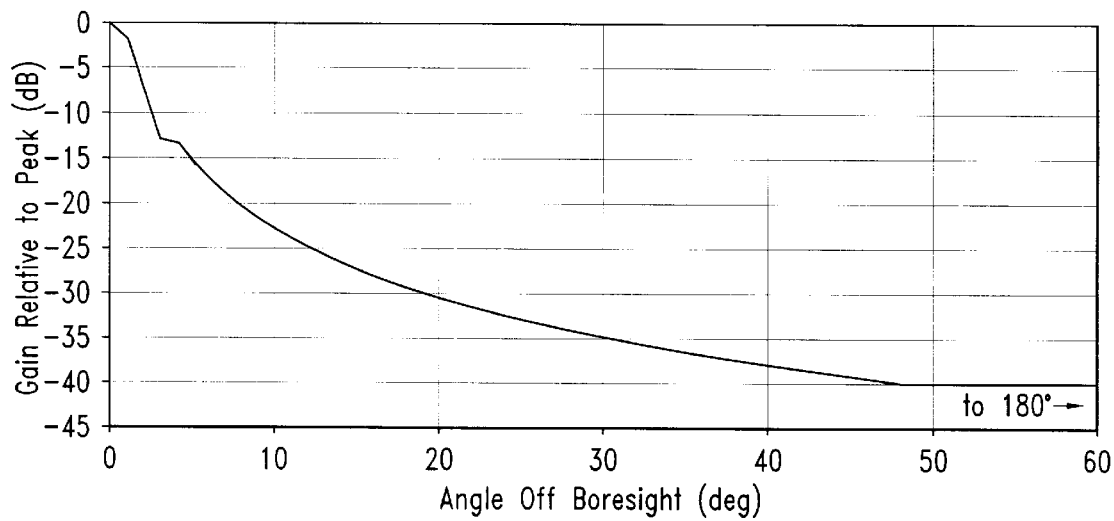
FIG. 2B is a graph of the transmit antenna pattern of an Earth-based station of the satellite communication system of the present invention.
Figure 2C:
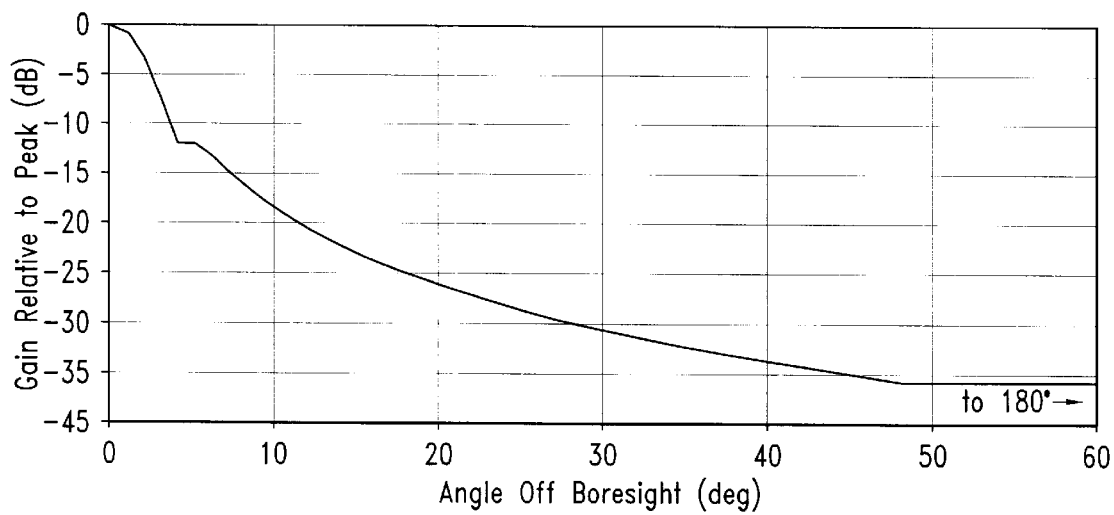
FIG. 2C is a graph of the receive antenna pattern of the Earth-based station of the satellite communication system of the present invention.

The antenna gain patterns for the Earth-based station of the systems 100A and 100B are illustrated in FIGS. 2B and 2C. FIG. 2B illustrates the transmit antenna gain pattern for the Earth-based station of the non-GSO FSS network while FIG. 2C illustrates the receive antenna gain pattern for the Earth-based station of the non-GSO FSS network. In an exemplary embodiment, the peak gain of the Earth-based station transmit antenna is 36 dBi while the peak gain of the Earth-based station receive antenna is 33 dBi. As is apparent from FIGS. 2B and 2C, both the transmit and receive antennas of the Earth-based station are highly directional, which improves discrimination when receiving signals from or transmitting signals to the orbiting satellites.

To analyze potential interference between the two non-GSO FSS network systems LEO SAT-1A and LEO SAT-1B, it is assumed that the two systems use identical mapping of the super-cells 140 over the Earth's surface with one Earth-based station from each system placed at the center of each supercell. This results in a worst-case interference analysis since both the LEO SAT-1A and LEO SAT-1B systems use the same frequencies at the same time and location in the same Earth-fixed cells.

The communication parameters for the LEO SAT-1A and LEO SAT-1B systems are shown below in Table 2.

TABLE 2

| LEO SAT-1A and LEO SAT-1B Communications Parameters | |
| --- | --- |
| Uplink Polarization | LHC/RHC |
| Downlink Polarization | LHC/RHC |
| Satellite Transmit Power (dBW) | 19.72 |
| Satellite Transmit Antenna Peak Gain (dBi) | 29.8 to 32.0 |
| Satellite Transmit Bandwidth (MHz) | 500 |
| Earth Station Receive Antenna Peak Gain (dBi) | 33.0 |
| Earth Station Transmit Power (Full Capacity) (dBW) | 2.07 |
| Earth Station Transmit Antenna Peak Gain (dBi) | 36.0 |
| Earth Station Transmit Bandwidth (Full Capacity) (MHz) | 35.2 |
| Satellite Receive Antenna Peak Gain (dBi) | 29.8 to 32.0 |

In a worst-case interference analysis of the system 100, the LEO SAT-1A and LEO SAT-1B systems are identical with their orbital planes interleaved and the Earth-based stations of the two systems co-located in each Earth-fixed super-cell 140. Under such circumstances, the interference from one system into the other is symmetric. Therefore, only two interference cases need be considered. The first case to consider (Case 1) is interference into the LEO SAT-1A Earth-based stations from one or more LEO SAT-1B satellites. The second case to consider (Case 2) is interference into LEO SAT-1A satellites from one or more LEO SAT-1B Earth-based stations.

With two identical non-GSO FSS network systems LEO SAT-1A and LEO SAT-1B, the primary interference contribution for Case 1 interference or Case 2 interference results from satellite communication to or from satellites serving the co-located Earth-based stations. In this situation, there is no discrimination from the satellite transmit or receive antennas since the satellites are servicing the same location on the Earth.

If the servicing satellites were also co-located with each other, the contribution to the interference from one satellite would exactly equal the carrier power of the other satellite, resulting in a carrier-to-interference (C/I) ratio of 0 dB. However, the interleaved orbits of the system 100 dictates that satellites cannot be co-located except near the poles. This is illustrated in FIG. 1A where the orbital planes 102 and 106 of the LEO SAT-1A and LEO SAT-1B systems, respectively, converge only near the north and south poles. Thus, the C/I ratio decreases as latitude increases. For almost any given latitude, there is some minimum topocentric separation existing between servicing satellites of the two systems LEO SAT-1A and LEO SAT-1B. This topocentric separation defines an angle that provides discrimination from the Earth-based station receive antenna in Case 1 interference and from the Earth-based station transmit antenna in Case 2 interference.

Figure 3A:
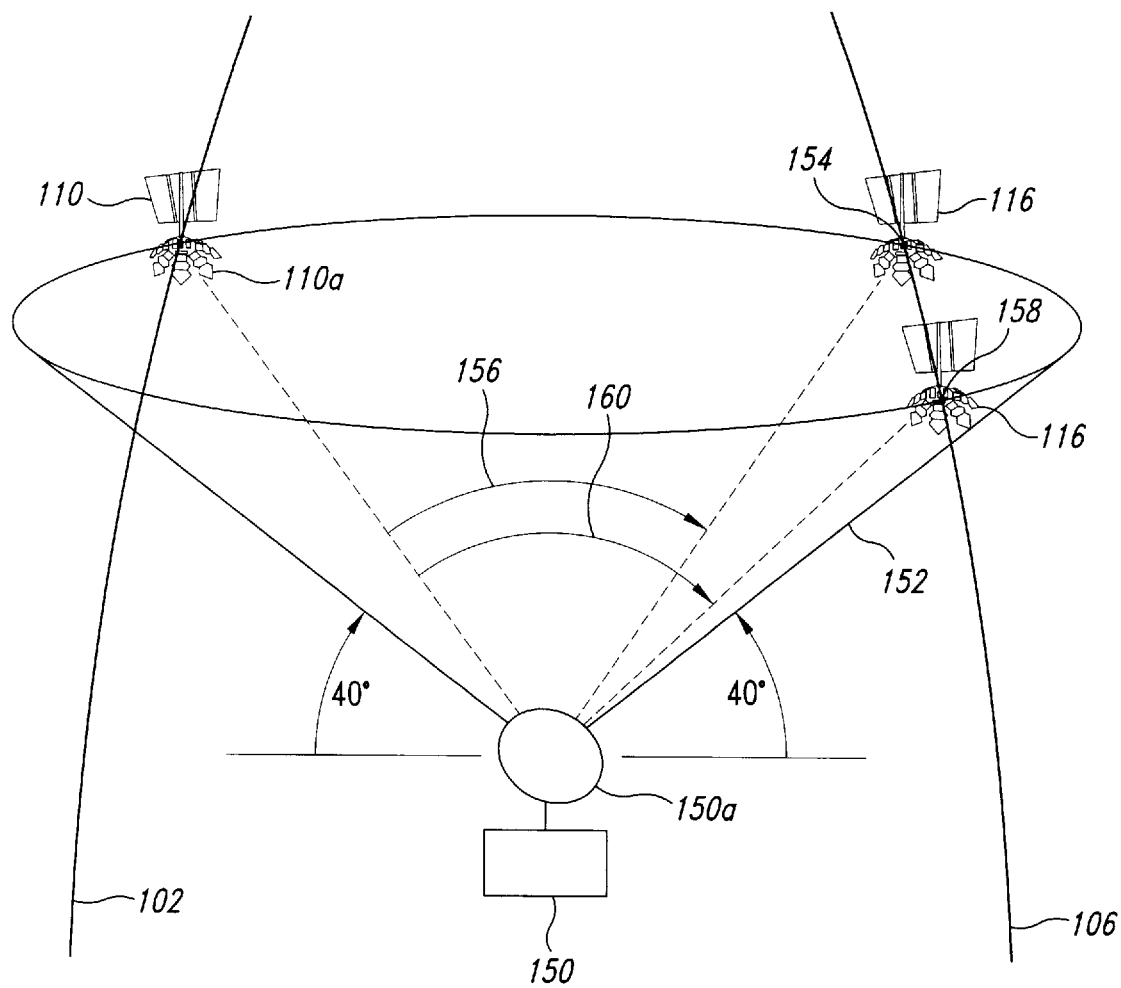
FIG. 3A illustrates the minimum and maximum topocentric separation of satellites of the present invention in adjacent orbital planes from an Earth-based station.

Because of the random phasing between satellites in adjacent orbital planes, the topocentric separation between a satellite from the LEO SAT-1A system and a satellite from the LEO SAT-1B system cannot be predicted. The minimum topocentric separation between a satellite from the LEO SAT-1A system and a satellite from the LEO SAT-1B system at any given instant in time is illustrated by FIG. 3A and identified by reference numeral 156. In FIG. 3A, the satellite 110 is orbiting the Earth in the orbital plane 102. The satellite 116 is orbiting the Earth in the adjacent interleaved orbital plane 106. An Earth-based station 150 includes an antenna 150a which has a mask angle of 40°. That is, the Earth-based station 150 will only communicate with a satellite that is at least 400 above the local horizon for the Earth-based station. The 40° masking angle effectively forms an upward projecting cone 152 from the Earth-based station 150. If the Earth-based station 150 is part of the LEO SAT-1A system, the Earth-based station will communicate with the satellite 110 in the orbital plane 102. The Earth-based station 150 is also susceptible to interference from the satellite 116, which is part of the LEO SAT-1B system and orbits the Earth in the orbital plane 106. As previously discussed, the relative position between satellites of the LEO SAT-1A system and LEO SAT-1B system is random. Therefore, the satellite 116 may at any time be at any point in the orbital plane 106 that falls within the 40° mask angle of the antenna 150a. This is illustrated in FIG. 3A by showing the satellite 116 at a first position 154 in the orbital plane 106. The location of the satellite 116 at the position 154 illustrates the minimum topocentric separation 156 between the satellites 110 and 116.

As shown in FIG. 3A, the satellite 116 may be positioned at a second location 158 in the orbital plane 106 due to the random phasing between satellites of the LEO SAT-1A system and the LEO SAT-1B system. FIG. 3A illustrates the maximum topocentric separation between the satellites 110 and 116. This maximum topocentric separation is identified in FIG. 3A by the reference numeral 160. Data provided below analyzes the effect of minimum and maximum topocentric separation for satellites of the LEO SAT-1A and LEO SAT-1B systems.

Figure 3B:
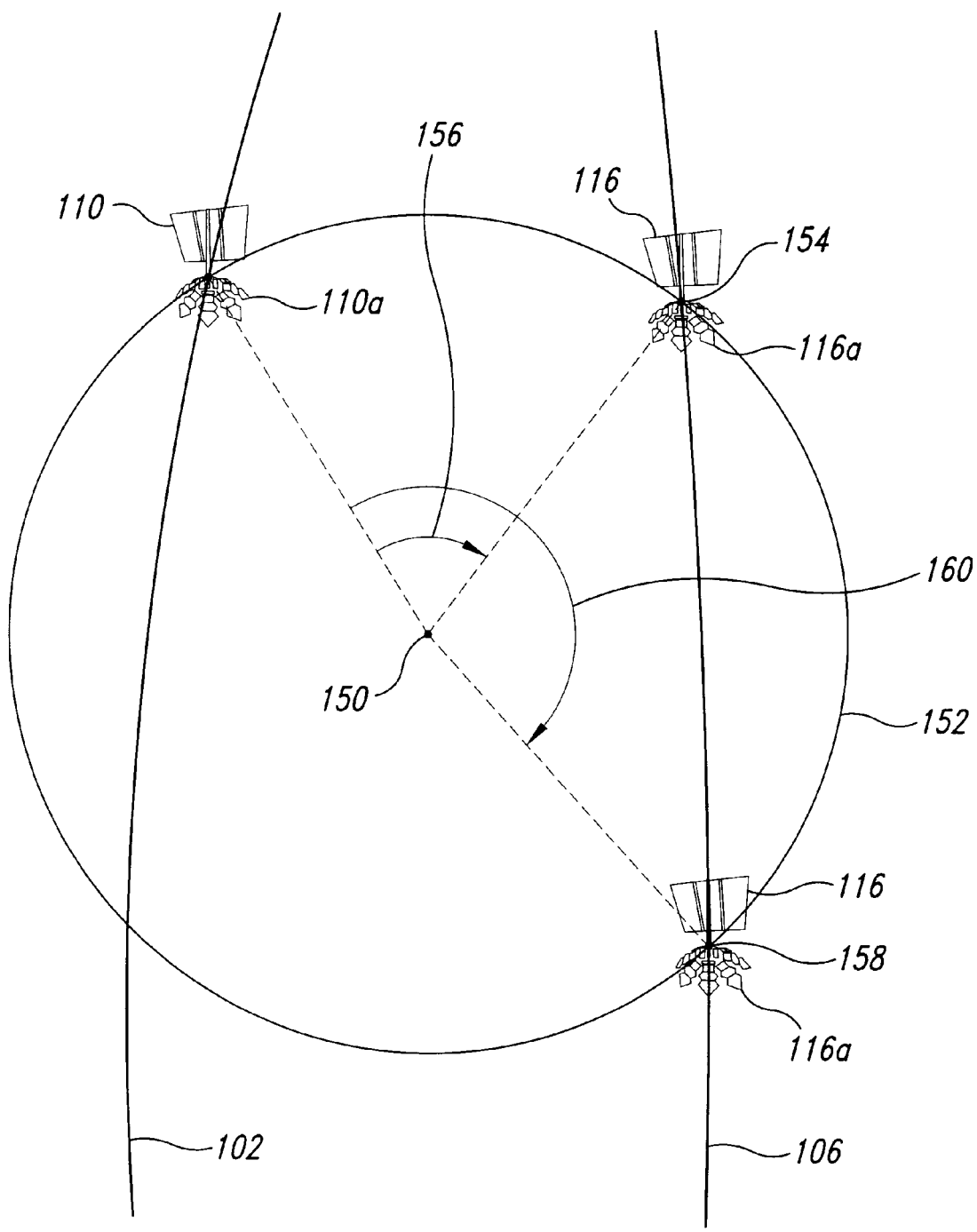
FIG. 3B is a top view of the Earth-based station of FIG. 3A illustrating the minimum and maximum topocentric separation of satellites of the present invention in adjacent orbital planes.

FIG. 3B is a top projection of FIG. 3A illustrating the upward projecting cone 152 and the orbital planes 102 and 106. The satellite 110 is orbiting the Earth in the orbital plane 102. The satellite 116 is orbiting the Earth in the orbital plane 106. The satellite 116 may be at the location 154 in the orbital plane 106, resulting in the minimum topocentric separation 156 between the satellites 110 and 116 with respect to the Earth-based station 150. However, the satellite 116 may be at the location 158 in the orbital plane 106, resulting in the maximum topocentric separation 160 between the satellites 110 and 116. It should be noted that the satellite 116 may be located at any point in the orbital plane between the location 154 and the location 158 and still be visible above the 40° mask angle of the antenna 150a (see FIG. 3A). The location of the satellite 116 at a point in the orbital plane 106 between the location 154 and the location 158 would result in a topocentric separation greater than the minimum topocentric separation 156 and less than the maximum topocentric separation 160.

Figure 3C:
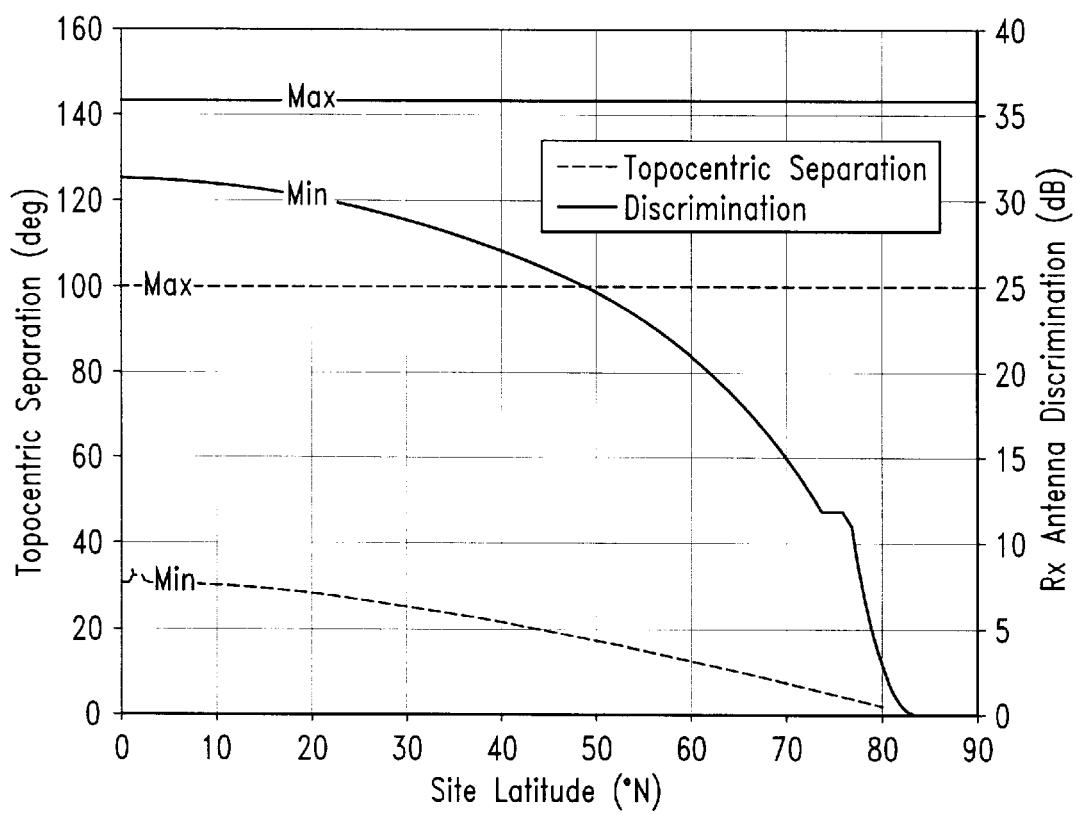
FIG. 3C is a graph of the topocentric separation and corresponding Earth-based station antenna discrimination as a function of latitude of the Earth-based station of the satellite communications system of the present invention.

FIG. 3C is a graph illustrating the minimum topocentric separation 156 and the maximum topocentric separation 160 as a function of site latitude (ie., latitude of the Earth-based station 150). The maximum topocentric separation in FIG. 3C is governed by the *40°* mask angle and the orbital altitude of the satellites. Although FIG. 3B illustrates topocentric separation and antenna discrimination for latitudes ranging from 0° to 90° N latitude, Earth-based stations in the southern hemisphere have identical results as those illustrated in FIG. 3C for the northern hemisphere. The corresponding receive antenna maximum and minimum discrimination provided by the Earth-based station antenna 150a at the indicated topocentric separation is also shown in FIG. 3C as a function of latitude. It can be seen from FIG. 3C that the minimum discrimination of the antenna 150a is greater than 25 dB for an Earth-based station with a latitude less than 48°. Therefore, the C/I ratio for Case 1 interference (interference into the LEO SAT-1A Earth-based station from the LEO SAT-1B satellites) will exceed 25 dB for an Earth-based station with a latitude less than 50°. The minimum topocentric separation 156 (see FIG. 3A) (at 40° as a result of the antenna masking) decreases as the latitude of the Earth-based station 150 increases. However, a larger number of servicing satellites from other orbital planes become visible at higher latitudes, and it is less likely that a satellite at 40° elevation will be selected as the servicing satellite for the Earth-based station 150. As will be discussed in greater detail below, a larger number of satellites above the 40° mask angle permits the selection of a servicing satellite for the Earth-based station from among a larger number of satellites. Proper satellite selection will therefore effectively increase the minimum topocentric separation of servicing satellites for a given Earth-based station 150 as the latitude of the Earth-based station gets closer to the poles.

Figure 4:
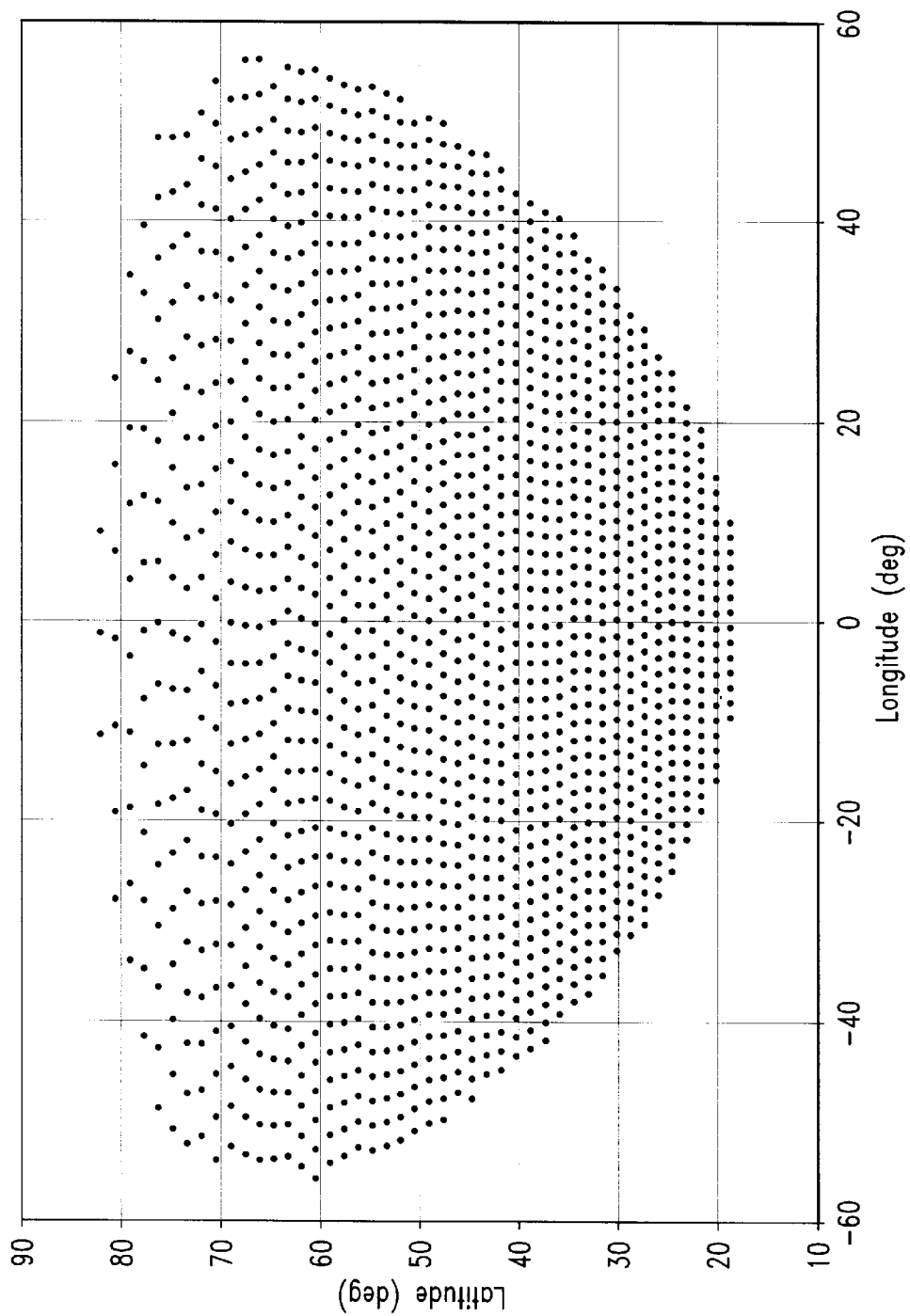
FIG. 4 illustrates the distribution of Earth-based stations of the satellite communication system of the present invention to analyze interference at a selected one of the Earth-based communication stations at 50° N latitude, 0° W longitude.

To analyze the effectiveness of the system 100 to minimize interference between the two non-GSO FSS network systems LEO SAT-1A and LEO SAT-1B, a computer simulation program was developed. The simulation program maps a portion of the Earth around a specified latitude and longitude with super-cells 140 (see FIG. 1C) and places an Earth-based station from each system at the center of each super-cell. FIG. 4 illustrates a sample of the ground-based portion of the system 100 modeled by the simulation program for an Earth-based station located at 50° N latitude, 0° W longitude. Each dot in FIG. 4 represents an Earth-based station for each of the LEO SAT-1A and LEO SAT-1B systems. Each Earth-based station is assumed to be at the center of the super-cell 140 (see FIG. 1C) and is modeled as operating at a maximum data capacity. The positions of the satellites in both the LEO SAT-1A and LEO SAT-1B systems are propagated forward in discrete time-steps by the simulation program to simulate satellite motion. At each time step of the simulation the nearest satellite is selected to service each of the Earth-based stations. As those of ordinary skill in the art can appreciate, the satellite with the highest angle of elevation will have the lowest slant range. At each time-step of the computer simulation, the selection criterion results in the selection of the satellite with the highest angle of elevation to service each Earth-based station. However, as will be discussed in detail below, satellite selection may alternatively be based on a number of other selection criteria.

Figure 5:
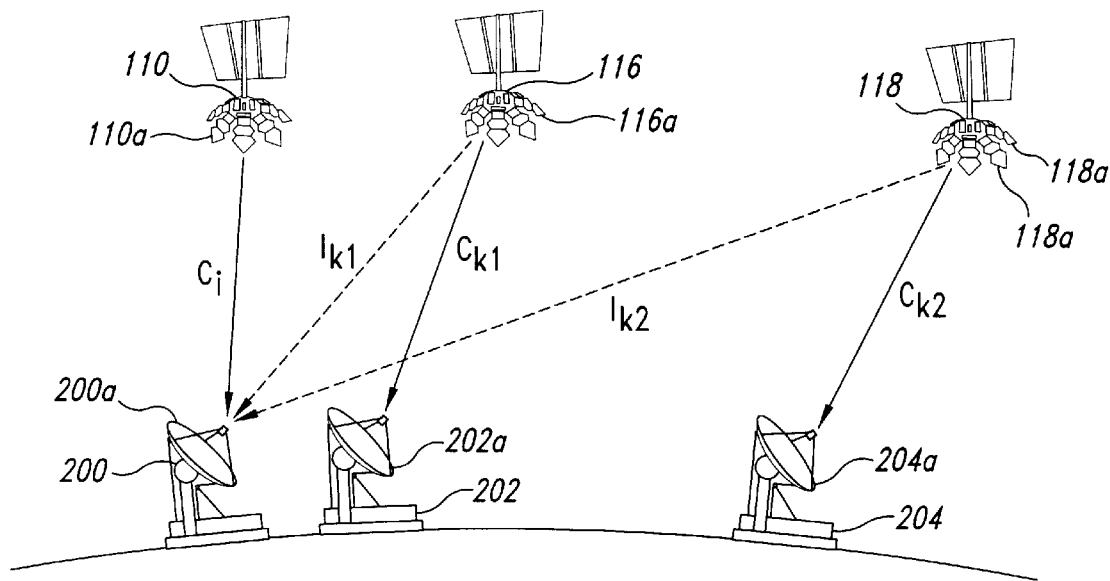
FIG. 5 illustrates two possible interference paths at Earth-based stations from non-geostationary satellites in adjacent orbital planes for the satellite communication system of the present invention.

FIG. 5 illustrates the positioning of Earth-based stations and satellites for the two non-GSO FSS network systems LEO SAT-1A and LEO SAT-1B. The arrangement illustrated in FIG. 5 is used by the simulation program to analyze Case 1 interference (i.e., interference from LEO SAT-1B satellites into a LEO SAT-1A Earth-based station). An Earth-based station 200, having an antenna 200a, is part of the LEO SAT-1A system and communicates with the satellite 110 in the orbital plane 102 (see FIG. 1A). An Earth-based station 202, having an antenna 202a, is part of the LEO SAT-1B system and communicates with the satellite 116 in the orbital plane 106. To simulate a worst-case interference analysis, it is assumed that the Earth-based stations 200 and 202 are co-located at the same location in the same super-cell 140 (see FIG. 1C). FIG. 5 also illustrates an Earth-based station 204 with an antenna 204a, which is also part of the LEO SAT-1B system. The Earth-based station 204 communicates with the satellite 118 in the orbital plane 108. The Earth-based station 204 is located in a different super-cell 140 than the co-located Earth-based stations 200 and 202.

FIG. 5 illustrates the technique used to measure interference at the Earth-based station 200 caused by signals from the satellites 116 and 118. The carrier signal designated as $C_i$ is the desired carrier signal transmitted from the satellite 110 to the Earth-based station 200. The desired carrier signal from the satellite 116 to the Earth-based station 202 is designated as $C_{k1}$ and the desired carrier signal from the satellite 118 to the Earth-based station 204 is designated as $C_{k2}$. FIG. 5 illustrates the presence of interference at the Earth-based station 200 due to signals from the satellites 116 and 118 from the LEO SAT-1B system into the Earth-based station 200, which is part of the LEO SAT-1A system. The interfering signals from the satellites 116 and 118 are designated by the reference $I_{k1}$ and $I_{k2}$, respectively. As is apparent from FIG. 5, the Earth-based station 200 receives the interference signals $I_{k1}$, and $I_{k2}$ in addition to the desired carrier signal $C_i$ from the satellite 110. At each time-step of the computer simulation, the interference from each of the LEO SAT-1B satellites visible to the Earth-based station 200, including the satellites 116 and 118, are computed and summed to find the total interference into the Earth-based station.

Figure 6:
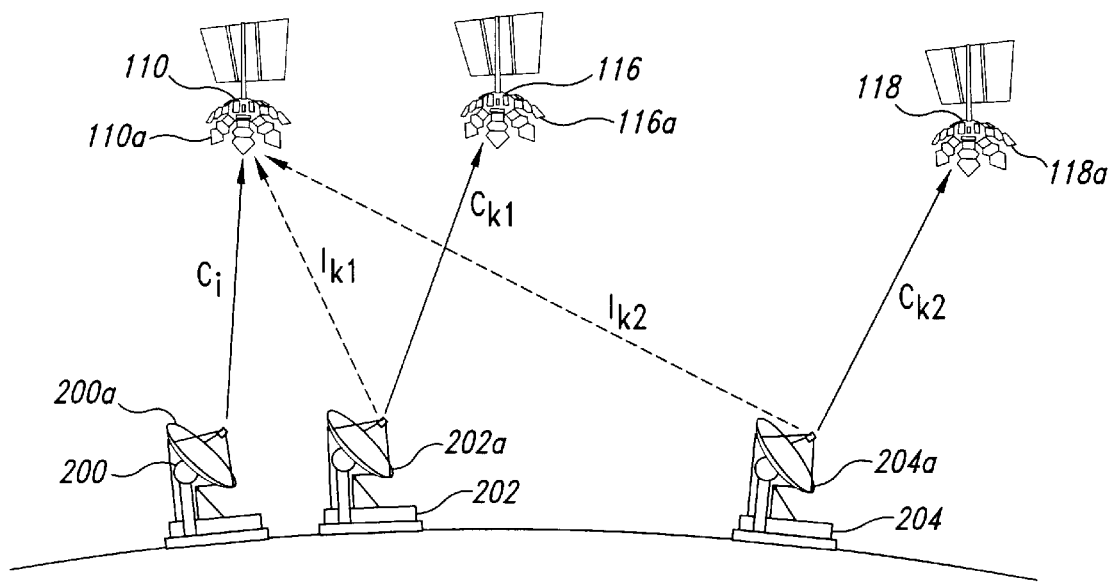
FIG. 6 illustrates two possible interference paths from ground-based stations into non-geostationary orbit satellites in adjacent orbital planes for the satellite communication system of the present invention.

A similar analysis may be performed to determine interference in Case 2 (i.e., interference from LEO SAT-1B Earth-based stations into LEO SAT-1A satellites) using the Earth-based stations and satellites of FIG. 5. FIG. 6 illustrates the positioning of Earth-based stations and satellites for the two non-GSO FSS network systems LEO SAT-1A and LEO SAT-1B. In FIG. 6, the Earth-based station 200 is transmitting a desired carrier signal $C_i$ to the satellite 110. The co-located Earth-based station 202 is transmitting a desired carrier signal $C_{k1}$ to the satellite 116 and the Earth-based station 204 is transmitting a desired carrier signal $C_{k2}$ to the satellite 118. The satellite 110 receives interference signals $I_{k1}$ from the co-located Earth-based station 202 and an interference signal $I_{k2}$ from the Earth-based station 204 in addition to the desired carrier signal $C_i$ from the Earth-based station 200. As previously discussed, symmetrical interference is generated into the LEO SAT-1B system from the LEO SAT-1A system.

The carrier-to-interference (C/I) ratios are computed by the following equation:

$$C/I = P_T^C + G_T^C(0) - PL^C + G_R^C(0) - 10\log\left(\sum_{\text{for all } I} 10^{\left[\frac{P_T^I + G_T^I(\theta_{I/C}) - PL^{I/C} + G_R^C(\theta_{C/I})}{10}\right]}\right) \quad (1)$$

where $P_T^C$ is the transmit power (dBW) of the desired signal;

$G_T^C$ (0) is the desired signal transmit antenna peak gain (dBi);

$PL^C$ is the path loss from the desired transmitter to the receiver (dB);

$G_R^C$ is the receiver antenna peak gain (dBi);

$P_T^I$ is the transmit power (dBW) of each interference signal;

$G_T^I$ ($\theta_{I/C}$) is the interference signal transmit antenna gain in the direction of the receiver (dB);

$PL^{I/C}$ is the path loss from the interfering transmitter to the receiver (dB); and $G_R^C(\theta_{C/I})$ is the receiver antenna gain in the direction of the interfering transmitter (dB).

The simulation program is used to calculate the interference statistics between the non-GSO FSS network systems LEO SAT-1A and LEO SAT-1B. Simulations were run for each of Case 1 and Case 2 described above, with the Earth-based station 200 centered at 0° longitude and latitudes ranging from 0° N to 80° N at increments of 1° latitude. The outputs of the simulation program are plotted in FIGS. 7A–7I for the various latitudes for both Case 1 interference (i.e., interference into the LEO SAT-1A Earth-based station from LEO SAT-1B satellites) and Case 2 interference (i.e., interference into the LEO SAT-1A satellite from the LEO SAT-1B Earth stations).

The simulation program performs conventional statistical analysis using Monte Carlo simulations and calculates the C/I ratio in the form of a cumulative probability distribution. As can be seen in FIGS. 7A–7I, the C/I ratio at lower latitudes, where the spatial separation approaches a maximum separation, is greater than 30 dB for Case 1 interference and greater than 35 dB for Case 2 interference. The C/I ratio slowly decreases as the latitude of the Earth-based stations increase due to the decreasing spatial separation in the orbital planes. For example, at 80° N latitude, illustrated in FIG. 7I, the C/I ratio for Case 1 interference may be as low as 12 dB. At 80° N latitude, the C/I ratio for Case 2 interference may be as low as 15 dB.

Figure 8:
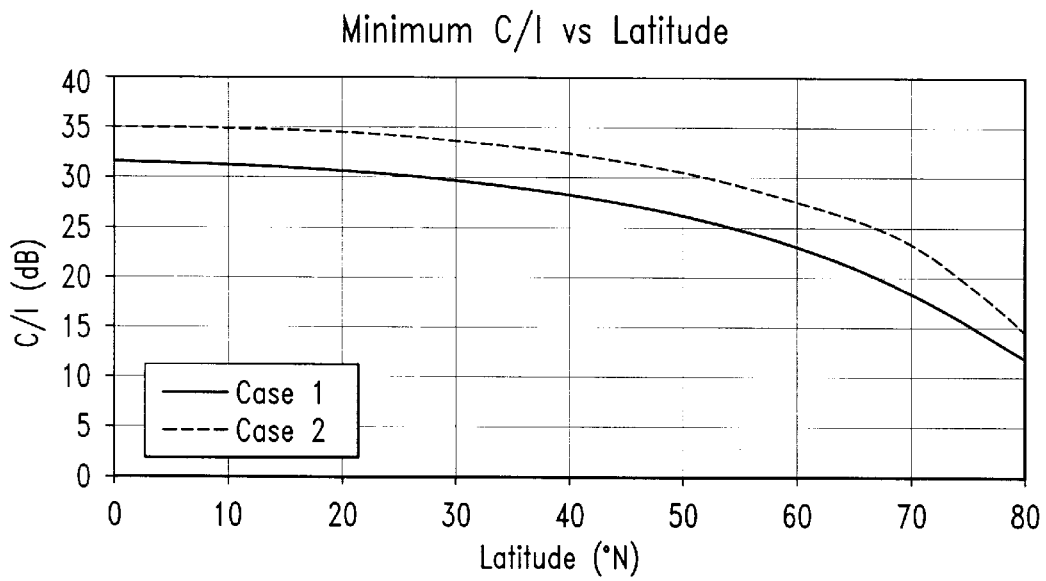
FIG. 8 is a graph of the minimum carrier power to interference power ratio achieved as a function of latitude of the Earth-based receiving station for the satellite communication system of the present invention.

The simulation program was executed with a time-step of four second time intervals for a period of 10 days for each latitude. The minimum C/I ratio observed over the simulation period is shown in FIG. 8 for both Case 1 interference and Case 2 interference. It should be noted that the minimum C/I for Case 1 interference in FIG. 8 follows the Earth-based station receive antenna discrimination illustrated in FIG. 3C at sufficiently low latitudes (e.g., below 40° N latitude). However, when a larger number of satellites from other orbital planes become visible at higher latitudes, the minimum elevation of the servicing satellites increases so that the minimum possible C/I ratio is never achieved at the higher latitudes. For example, FIG. 3C indicates that the minimum possible Earth-based station receiver discrimination at 80° N latitude is approximately 3 dB, which would result in a minimum C/I ratio of approximately the same value. However, the computer simulation indicates that the minimum C/I ratio achieved at 80° N latitude over the simulation time period of 10 days is approximately 12 dB. This is due to the fact that a larger number of satellites are visible above the 40° mask angle of the antenna 150a (see FIG. 3A) at 80° N latitude. Thus, the C/I ratio is greater than the expected minimum C/I ratio.

The system 100 takes advantage of the visibility of more satellites at higher latitudes in order to mitigate the increased interference due to the convergence of the orbital planes near the poles. As illustrated in FIGS. 7A–7I, the C/I ratio decreases at increasing latitudes. However, as previously discussed, the simulation program selects the closest satellite at each time-step of the simulation program. Such a selection criterion is not the most effective criterion at higher latitudes. One mitigation technique used by the combined system 100 is to give preference to satellites moving in opposite directions within the upward projecting cone 152 (see FIG. 3A) of the antenna 150a. This alternative selection criterion increases the minimum topocentric separation.

Figure 9:
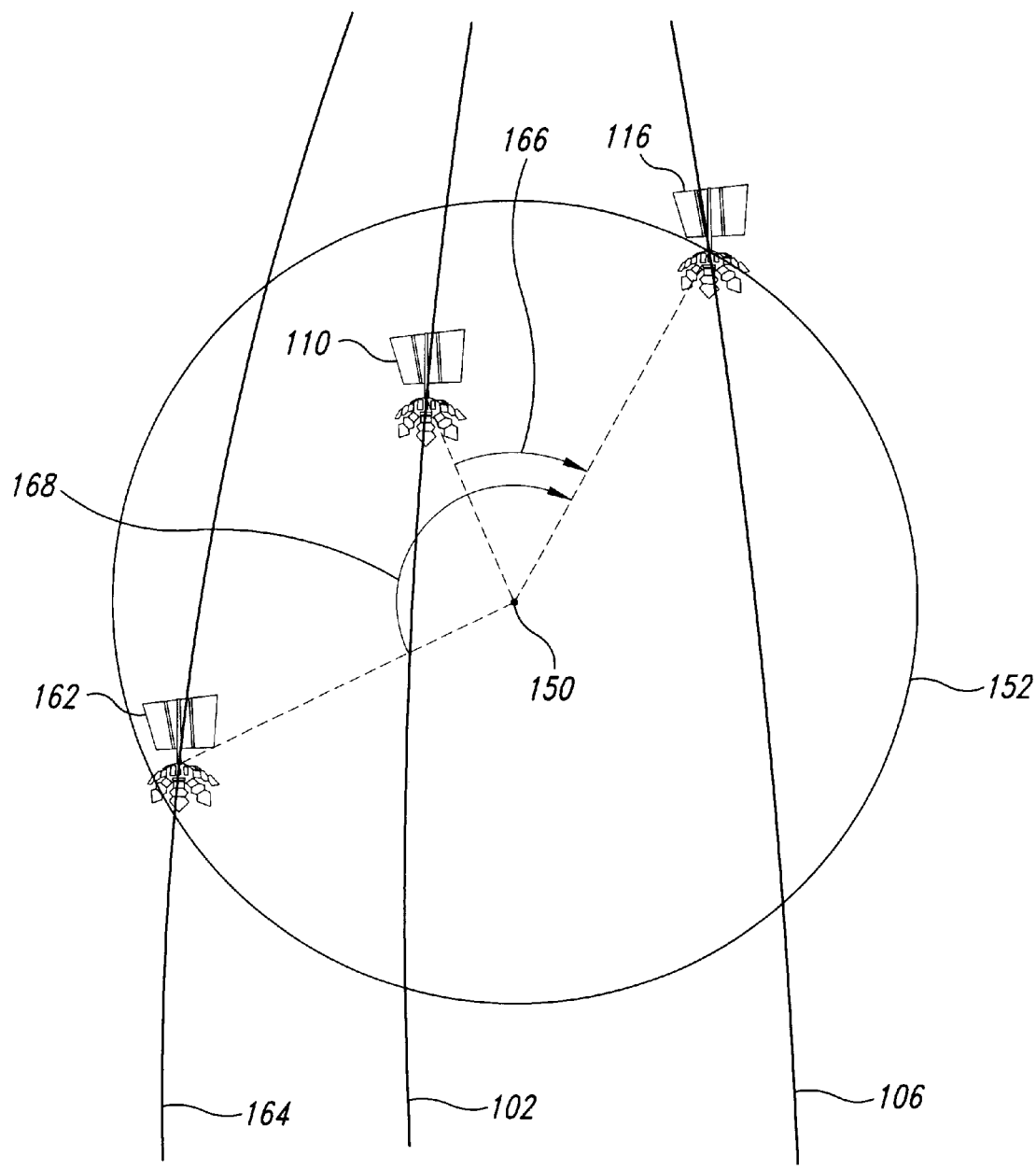
FIG. 9 is a top view of the Earth-based station of FIG. 3A illustrating a satellite selection technique used to increase the topocentric separation of satellites of the present invention in adjacent orbital planes at higher latitudes.

FIG. 9 illustrates the use of differing selection criteria and their effect on topocentric separation. In FIG. 9, the satellite 110 in orbital plane 102 and a satellite 162 in an orbital plane 164 are both visible above the 40° mask angle of the antenna 150a (see FIG. 3A). The satellites 110 and 162 are both part of the LEO SAT-1A system. The satellite 116 in the adjacent orbital plane 106 is also visible above the 40° mask angle of the antenna 150. Using the selection criterion of the closest satellite, the base station 150 would communicate with the satellite 110, which has a higher angle of elevation and thus a lower slant range than the satellite 162. The satellite 110 and satellite 116 have a topocentric separation illustrated in FIG. 9 by the reference numeral 166. However, using the alternative selection criterion results in the selection of the satellite 162 rather than the satellite 110. The satellite 162 and satellite 116 have a topocentric separation illustrated by the reference numeral 168. As is apparent from FIG. 9, the selection of the satellite 162, using the alternative selection criterion described above, results in a significant improvement in topocentric separation and a corresponding decrease in interference for both Case 1 interference and Case 2 interference.

Figure 7A:
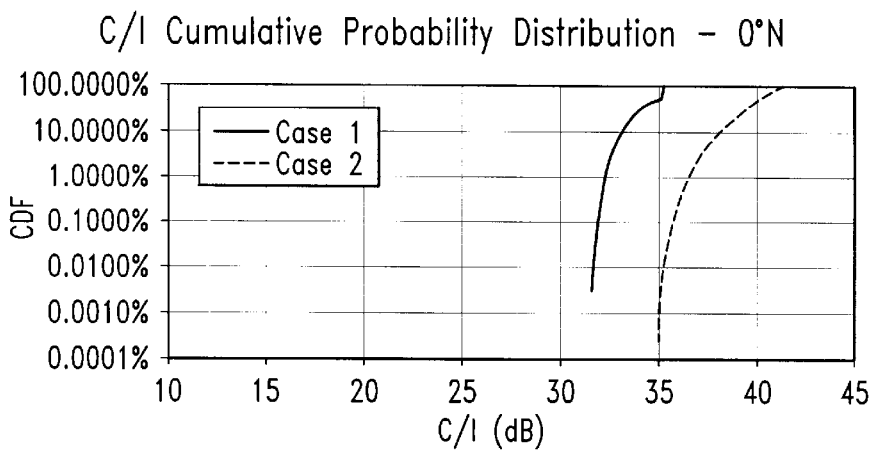
FIGS. 7A–7I are graphs of a cumulative probability distribution function of carrier power to interference power ratio for communications between satellites and Earth-based stations of the satellite communication system of the present invention at various latitudes of the Earth-based stations.
Figure 7B:
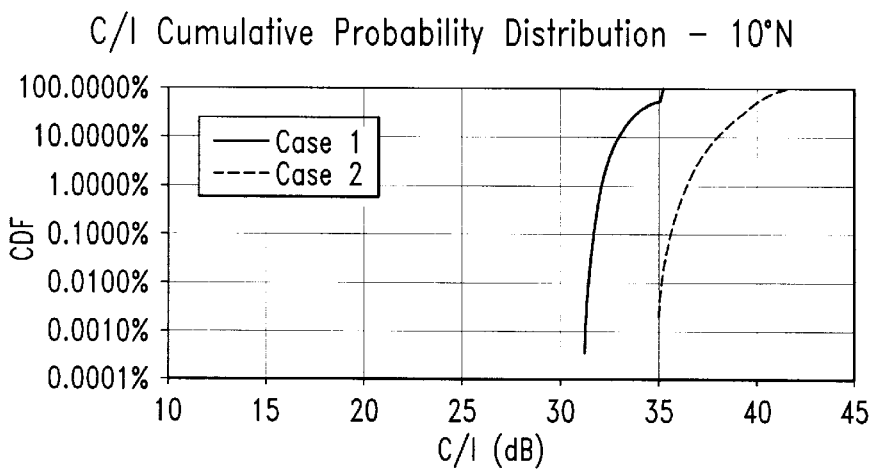
Figure 7C:
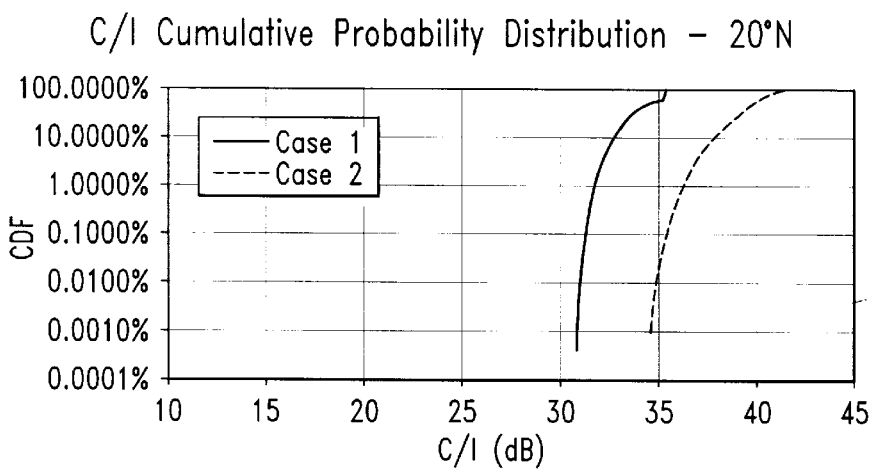
Figure 7D:
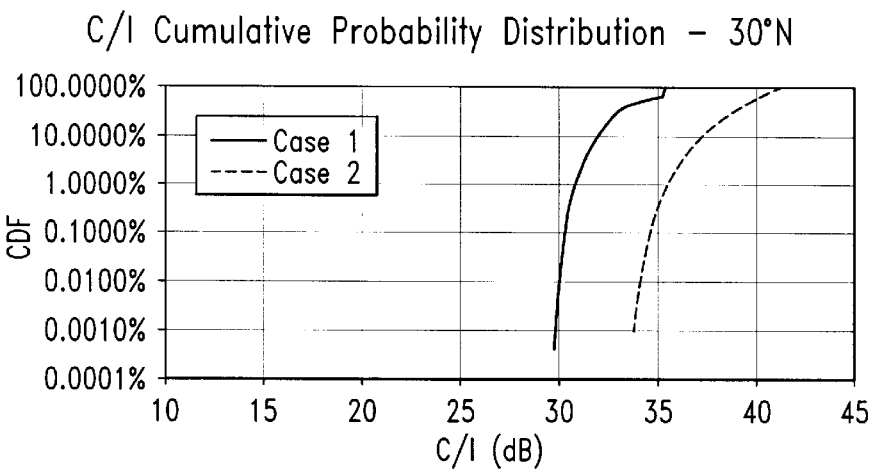
Figure 7E:
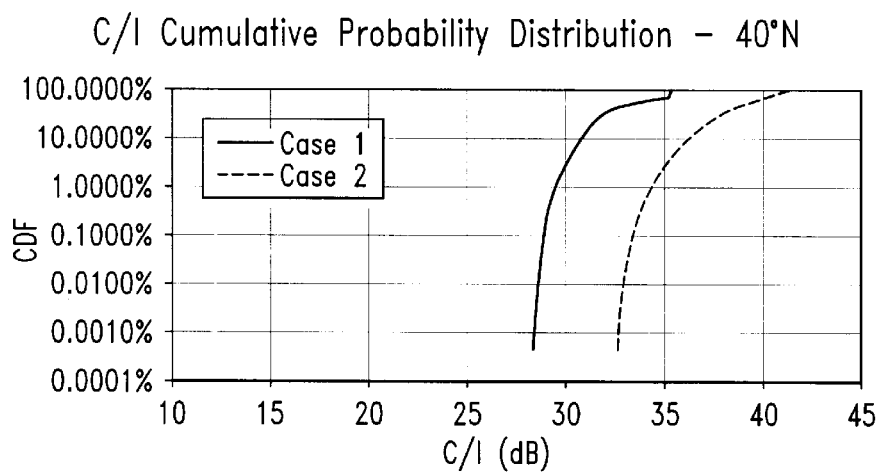
Figure 7F:
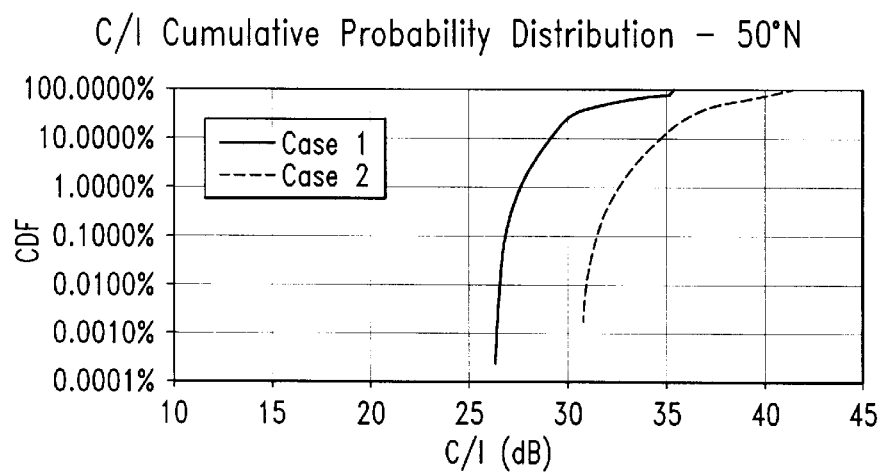
Figure 7G:
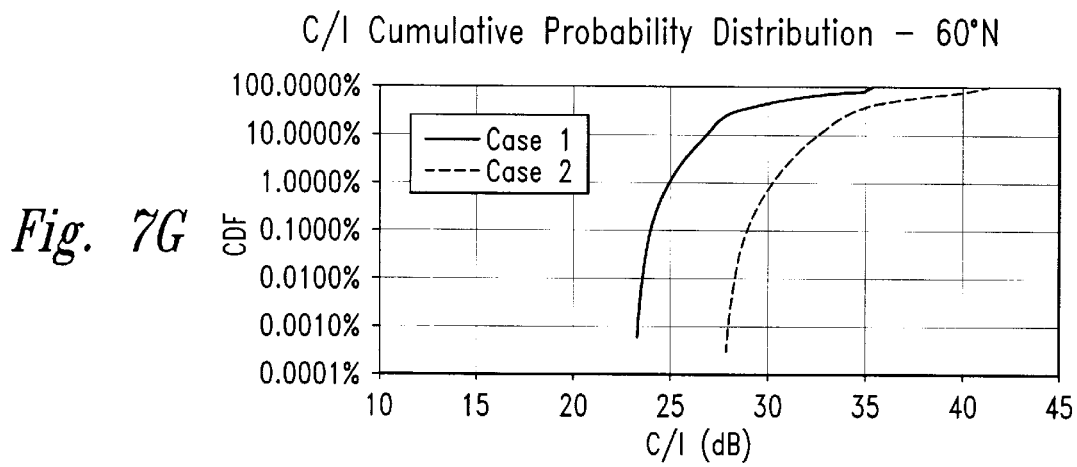
Figure 7H:
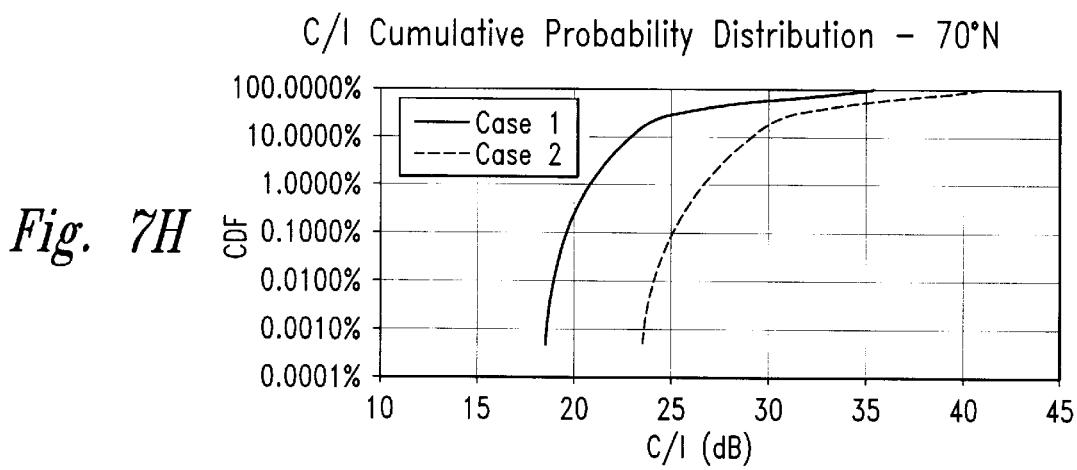
Figure 7I:
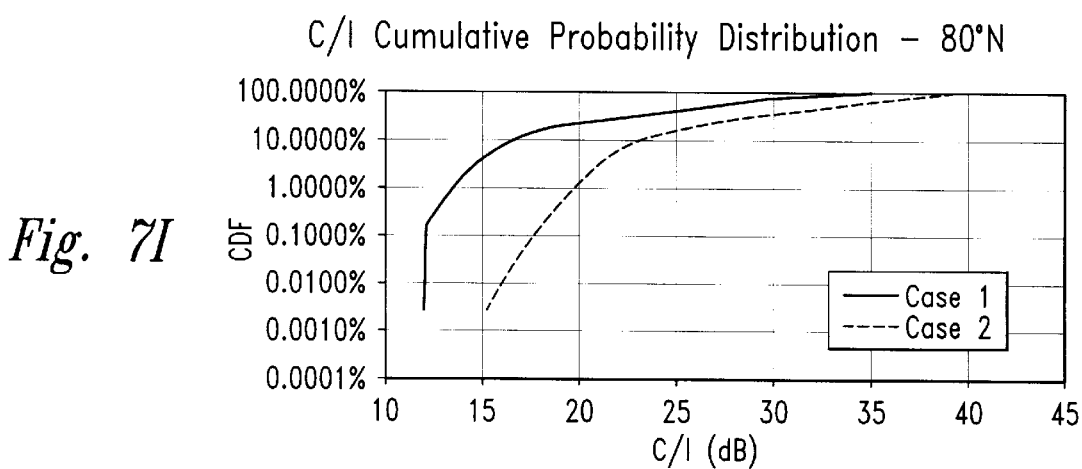
Figure 10:
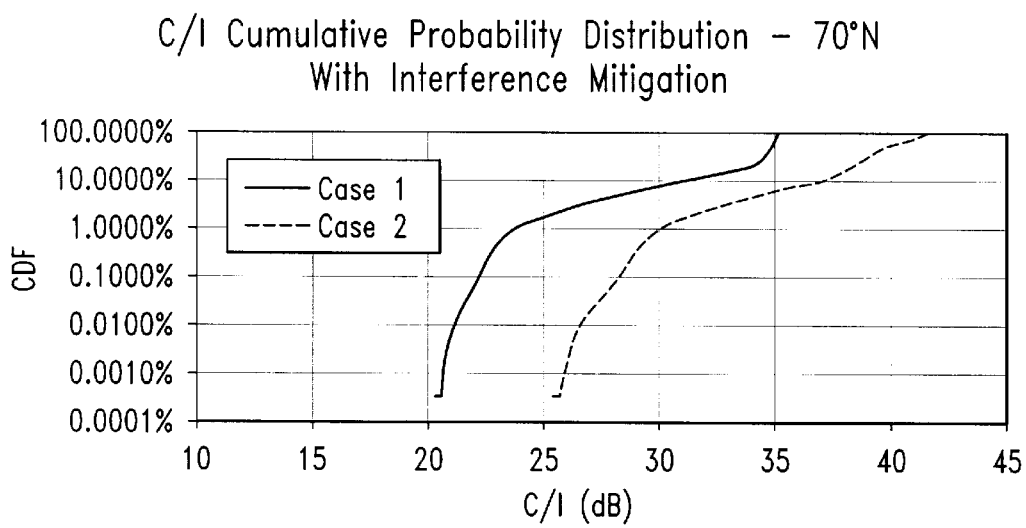
FIG. 10 is a cumulative probability distribution of carrier power to interference power ratio when the satellite system of the present invention uses techniques to minimize interference at higher latitudes.

FIG. 10 illustrates the cumulative probability distribution for Case 1 interference and Case 2 interference at 70° N latitude where the alternative selection criterion is applied. A comparison of FIG. 7H and FIG. 10 shows an improvement in the C/I ratio from 18.5 dB to 20.3 dB for Case 1 interference. A similar improvement from 23 dB to 26 dB is noted in the C/I ratio for Case 2 interference. Thus, the system 100 can apply different satellite selection criteria depending on the location of the Earth-based station.

Multiple satellite selection criteria may be applied to Earth-based stations 150 at any latitude to select a particular satellite with which to communicate. One such criterion, the selection of the satellite with the lowest slant range, has already been discussed. The selection of the satellite with the maximum topocentric separation can also be used as a satellite selection criterion for Earth-based stations 150 at any latitude. Other factors, such as the communication traffic load and direction of satellite movement, may also be used as satellite selection criteria. For example, the satellite with the lowest slant range or with the maximum topocentric separation may be in the process of receiving, processing, or transmitting a significant amount of data packet traffic. Rather than add to the queue in a satellite with heavy traffic, a different satellite having a lesser amount of traffic may be selected, to minimize the length of time for a given set of data packets to pass through the system 100. At constellation seams, rather than basing the satellite selection on minimum slant range or maximum topocentric separation, satellites may be selected based on increasing topocentric separation because satellites are traveling in opposite directions. These, and other forms of selection criteria, may be applied individually or in combination, to select a satellite for communication with the Earth-based station 150. The only absolute requirement in satellite selection is that the signal strength be sufficiently high (i.e., a minimum C/I ratio) to permit reliable communication. Thus, any satellite can be selected for communication with the Earth-based station 150 as long as the interference with adjacent satellites is maintained at an acceptable level.

Figure 11:
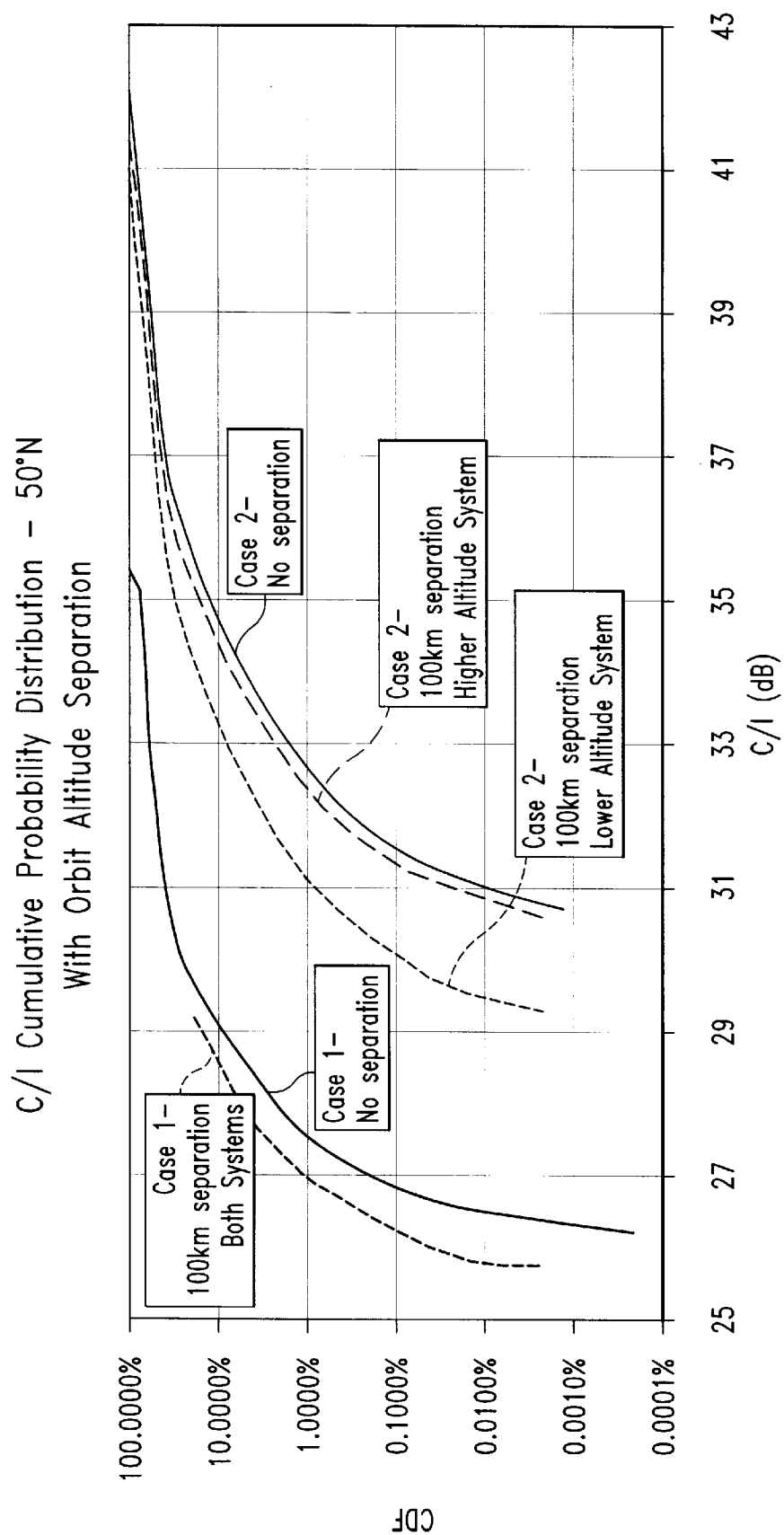
FIG. 11 is a cumulative probability distribution of carrier power to interference power ratio illustrating the effect of orbital altitude separation at a selected latitude for two satellite communication systems using the principles of the present invention.

The present invention is also applicable if the satellites of the LEO SAT-1A and LEO SAT-1B systems are separated in orbital altitude. The simulation program found little effect on the C/I ratios when the satellites of the two systems were so separated. For purposes of simulating the effect of altitude differences, the satellites of the LEO SAT-1A system were assumed to have a 700 kilometer orbital altitude while the satellites of the LEO SAT-1B system were assumed to have an 800 kilometer orbital altitude. It should be noted that the interference into one satellite system from the other satellite system is not necessarily symmetric when the altitudes of the two satellite systems are different. The cumulative probability distribution of the C/I ratio is illustrated in FIG. 11 for an Earth-based station at 50° N latitude. As shown for Case 2 interference (i.e., interference into the satellites of one satellite system from the Earth-based stations of the other satellite system), there is virtually no change in the C/I ratio for the higher altitude satellites of the LEO SAT-1B system. However, there is approximately a 1.5 dB decrease in the C/I ratio for the lower altitude satellites of the LEO SAT-1A system. This is due to the fact that power control is used on the Earth-based stations when transmitting to satellites. The Earth-based stations of the LEO SAT-1B satellite system increase power to compensate for the free space loss in signal transmitted to the satellites of the higher altitude LEO SAT-1B system. The increased power from the Earth-based stations of the LEO SAT-1B system causes an increase in interference and thus a decrease in the C/I ratio for the LEO SAT-1A satellites.

FIG. 11 also shows that the change in altitudes for the two communication systems caused a decrease of approximately 0.5 dB in the C/I ratio for Case 1 interference (i.e., interference into the Earth-based stations of one satellite system from the satellites of the other satellite system). It should be noted that the decrease in the C/I ratio is nearly symmetric for both the Case 1 interference into the LEO SAT-1A system and the interference into the LEO SAT-1B system. This symmetry is due to the fact that the primary source of interference in each of the satellite systems is due to the interference contribution from the satellites serving the co-located Earth-based stations and because no power control is used on the satellites themselves. The 0.5 dB decrease in the C/I ratio is due primarily to the smaller topocentric angle possible when the altitude of one of the systems is increased.

The system 100 has been described for co-frequency sharing among two satellite systems, each having a plurality of satellites in near polar low-Earth orbits. However, the principles of the present invention may be applied to more than two satellite communication systems. For example, three or more satellite communication systems may have satellites deployed in interleaved orbital planes with the satellites of a particular satellite communication system occupying every Nth orbital plane where N is the number of satellite communication systems that co-frequency share in accordance with the principles of the present invention. As more satellite systems are added in interleaved orbital planes, interference will increase. The only limitation on the number N of satellite communication systems that operate within the same frequency bandwidth is that interference must be kept to an acceptable level.

The principles of the present invention may also be applied to satellite constellations whose inclination i varies significantly from 90°. The operation of the system 100 in non-polar orbits requires the appropriate selection of orbital altitudes and inclination so that satellites in the various orbital planes have equal rates of precession with respect to each other. The selection of the appropriate orbital inclination and orbital altitude can be readily determined using conventional textbooks, such as "Communications Satellite Handbook," and "Orbital Mechanics," edited by Vledimir A. Chobotov, published by the American Institute of Aeronautics and Astronautics, Inc., Washington, D.C.

At an inclination i of approximately 90°, the orbital planes in the system 100 converge near the north and south poles. Earth-based communication stations located at higher latitudes experience greater interference due to decreased topocentric separation resulting from the convergence of the orbital planes. However, satellite selection techniques have been discussed that effectively keep interference to an acceptable level. As the inclination i varies from 90°, the resulting orbital planes have orbital crossings at lower altitudes. Earth-based communication stations located at latitudes near the convergence of non-polar orbits will experience similar interference due to decreased topocentric separation. However, using the principles of the present invention, it is possible to mitigate the effects of converging orbital planes using the satellite selection techniques described above so as to reduce interference to an acceptable level.

Thus, the system 100 achieves greater discrimination and increased C/I ratio by providing appropriate geometric and spatial separation of orbiting satellites through the use of interleaved orbital planes.

Figure 12:
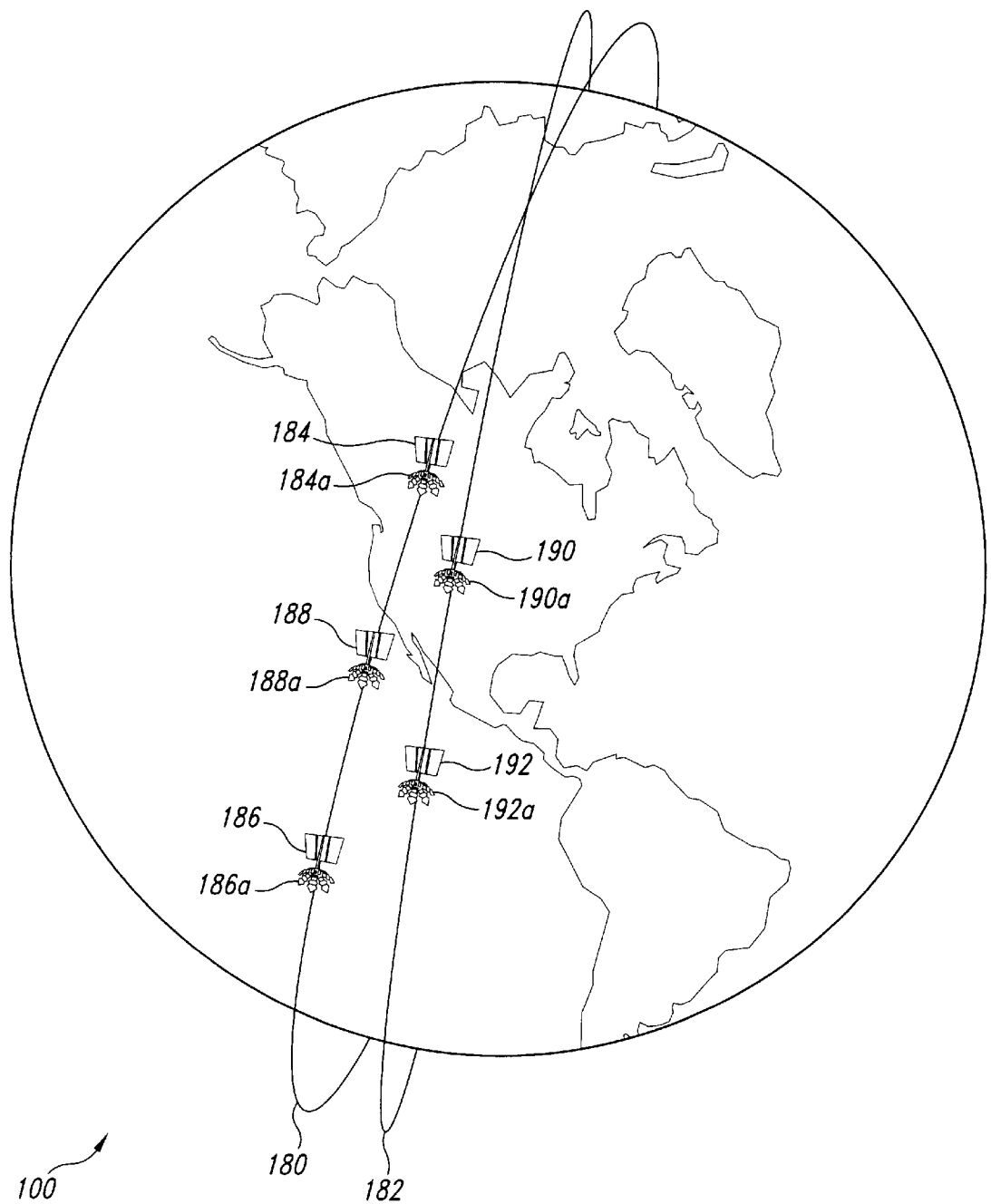
FIG. 12 illustrates the Earth and two near polar low-Earth orbited planes containing satellites of first and second satellite systems interleaved within a single orbital plane.

In an alternative embodiment, satellites of the LEO SAT-1A and LEO SAT-1B systems may be interleaved within a single orbital plane as opposed to interleaving orbital planes of the different satellite systems. This is illustrated in FIG. 12 where orbital planes 180 and 182 each contain satellites from both the LEO SAT-1A system and LEO SAT-1B system. It should be noted that, for the sake of clarity, FIG. 12 only illustrates two of the near-polar orbital planes used by the system 100. Furthermore, to clearly illustrate the positioning of satellites in accordance with the principles of the present invention, FIG. 12 depicts only a few satellites. However, the principles of the present invention are readily extended to the orbiting constellations of satellites previously discussed. Within the orbital plane 180 are a satellite 184 having an antenna 184a and a satellite 186 having an antenna 186a. The satellites 184 and 186 are both satellites in the LEO SAT-1A system. Located intermediate the satellites 184 and 186 within the same orbital plane 180 is a satellite 188 having an antenna 188a. The satellite 188 is part of the LEO SAT-1B system. In the adjacent orbital plane 182 are a satellite 190 having an antenna 190a and a satellite 192 having an antenna 192a. The satellites 190 and 192 are in the LEO SAT-1A and LEO SAT-1B systems, respectively. The operational characteristics of the satellites of both the LEO SAT-1A system and the LEO SAT-1B system, as well as the operational characteristics of the respective Earth-based stations of each system, have been previously described. As with the previously-described embodiment, the LEO SAT-1A and LEO SAT-1B systems may be identical satellite communication systems. With appropriate spacing of the satellites of the LEO SAT-1A and LEO SAT-1B systems within the orbital plane 180, it is possible to provide a topocentric separation between the satellites that allows the satellites to share the same radio frequency spectrum but maintain interference at a level that assures satisfactory operation of the two satellite systems.

Figure 13:
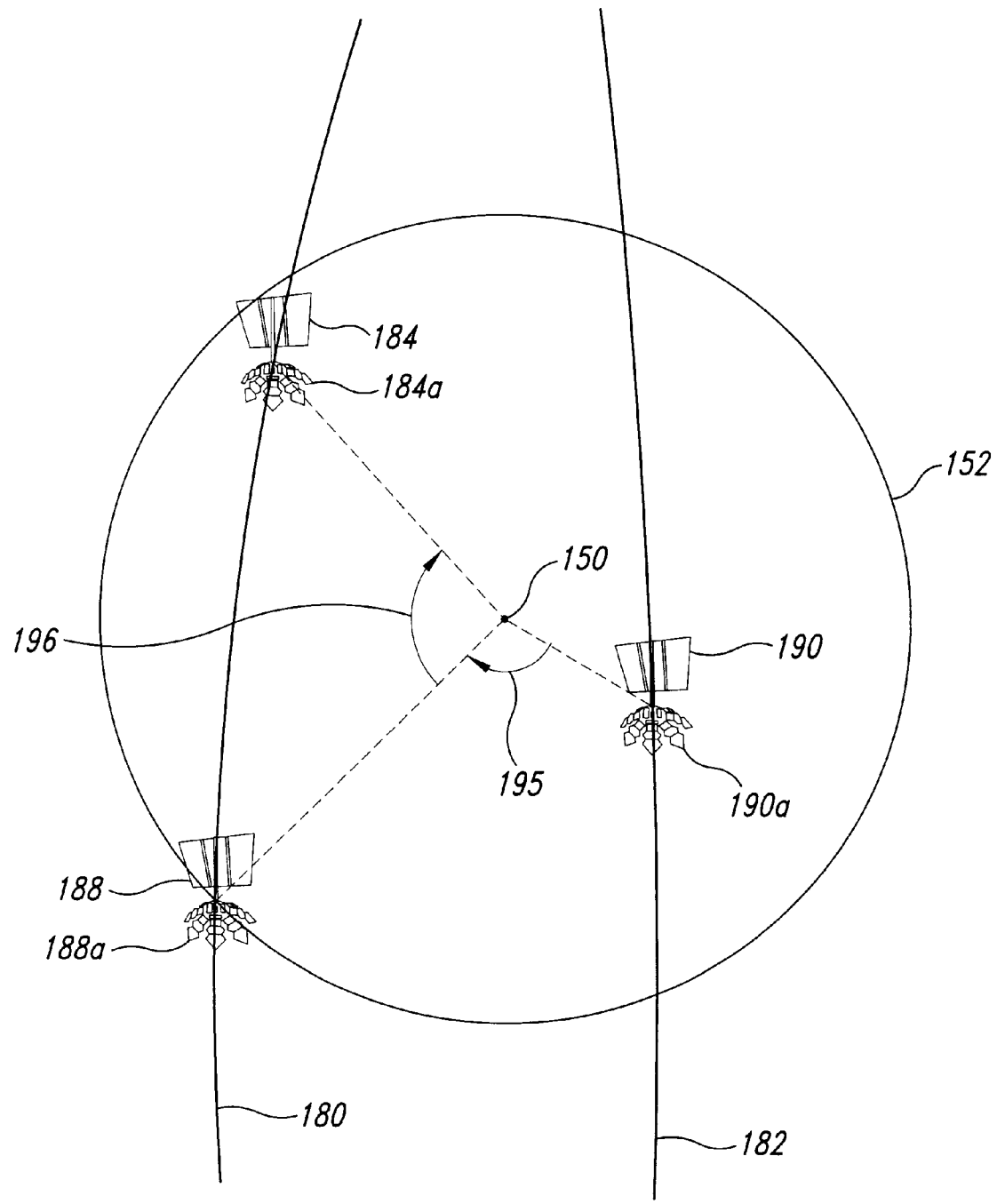
FIG. 13 is a top view of the Earth-based station of FIG. 3A illustrating a satellite selection technique based on the topocentric separation of satellites in adjacent orbital planes.

Furthermore, alternative satellite selection criteria, such as selection of the closest satellite, the criterion used with Earth-based stations located at higher latitudes, or the criteria based on the amount of communication traffic load may also be used with this embodiment. This is illustrated in FIG. 13 where the satellite 184 and satellite 188 in the orbital plane 180 are both visible above the 40° mask angle of the antenna 150a (see FIG. 3A) of the Earth-based station 150. The satellites 184 and 188 are portions of the LEO SAT-1A and LEO SAT-1B systems, respectively. Also illustrated in FIG. 13 is the satellite 190 in the orbital plane 182. The satellite 190 is a portion of the LEO SAT-1A system. Using the selection criterion of the closest satellite, the base station 150 would communicate with the satellite 190, which has a higher angle of elevation and thus a lower slant range than the satellite 184. The satellite 190 and satellite 188 have a topocentric separation illustrated in FIG. 13 by the reference numeral 195. Using the alternative selection criterion based on topocentric separation, however, results in the selection of the satellite 184 rather than the satellite 190. The satellite 184 and satellite 188 have a topocentric separation illustrated in FIG. 13 by the reference numeral 196. As is apparent from FIG. 13, the selection of the satellite 184, results in a significant increase in topocentric separation and a corresponding decrease in interference for both Case 1 interference and Case 2 interference. Thus, the interleaving of satellites within a single orbital plane can provide the necessary topocentric separation to assure satisfactory operation of the system 100.

Thus, interleaving of satellites from the LEO SAT-1A system and LEO SAT-1B system within each orbital plane also permits a high degree of sharing of the RF spectrum. The principles of the alternative embodiment illustrated in FIG. 12 may be extended to more than two satellite systems. Based on these techniques, multiple non-GSO FSS network systems can share the same RF spectrum. The total number of non-GSO FSS network systems that can potentially share the RF spectrum using these techniques is limited by the amount of acceptable aggregate interference levels resulting from the addition of more satellites and a corresponding decrease in topocentric separation.

In yet another alternative embodiment, a combination of the two techniques described above can be used where orbital planes of the LEO SAT-1A and LEO SAT-1B systems are interleaved, and satellites within the orbital planes are interleaved.

From the foregoing it will be appreciated that, although specific embodiments of the invention have been described herein for purposes of illustration, various modifications may be made without deviating from the spirit and scope of the invention. For example, the principles described herein for LEO could be applied to any non-GSO satellites, such as a medium-Earth orbit system. Accordingly, the invention is not limited except as by the appended claims.

What is claimed is:

1. A system for sharing a radio frequency spectrum between first and second satellite communication systems, the system comprising:
    a first plurality of Earth-based communication stations operating as an Earth-bound portion of the first satellite communication system;
    a second plurality of Earth-based communication stations operating as an Earth-bound portion of the second satellite communication system;
    a first plurality of satellites in non-geostationary Earth orbits and operating as a satellite portion of the first satellite communication system to communicate with said first plurality of Earth-based communication stations, each of said satellites of said first plurality of satellites orbiting the Earth in one of a plurality of orbital planes; and
    a second plurality of satellites in non-geostationary orbits and operating as a satellite portion of the second satellite communication system to communicate with said second plurality of Earth-based communication stations, each of said satellites of said second plurality of satellites orbiting the Earth in one of said plurality of orbital planes, said satellites of said first and second pluralities of satellites being in alternate positions within at least one of said orbital planes, whereby the first and second satellite communication systems share the radio frequency spectrum by interleaving said satellites of said first and second pluralities of satellites in at least one orbital plane.

2. The system of claim 1, further including a directional antenna coupled to each of said satellites of said first plurality of satellites, said antenna of a particular satellite of said first plurality of satellites being oriented to transmit radio frequency signals from said particular satellite to a particular one of said first plurality of Earth-based communication stations and thereby reduce transmission of radio frequency signals from said particular satellite of said first plurality of satellites to said second plurality of Earth-based communication stations.

3. The system of claim 1, further including a directional antenna coupled to each of said first plurality of Earth-based communication stations, said antenna of a particular one of said first plurality of Earth-based communication stations being oriented to transmit radio frequency signals from said particular Earth-based communication station to a particular satellite of said first plurality of satellites and thereby reduce transmission of radio frequency signals from said particular Earth-based communication station of said first plurality of Earth-based communication stations to said second plurality of satellites.

4. The system of claim 1, further including an antenna coupled to each of said first plurality of Earth-based communication stations, said antenna of a particular one of said first plurality of Earth-based communication stations being oriented to communicate with a plurality of said satellites in said first plurality of satellites, said particular Earth-based communication station communicating with a selected satellite of said first plurality of satellites selected based on a topocentric separation between said selected satellite and said satellites of said second plurality of satellites.

5. The system of claim 4 wherein said selected satellite of said first plurality of satellites is selected to have a minimum acceptable topocentric separation between said selected satellite and said satellites of said second plurality of satellites.

6. The system of claim 1, further including an antenna coupled to each of said first plurality of Earth-based communication stations, said antenna of a particular one of said first plurality of Earth-based communication stations being oriented to communicate with a plurality of said satellites in said first plurality of satellites, said particular Earth-based communication station communicating with a selected satellite of said first plurality of satellites selected based on a lowest slant range.

7. The system of claim 1, further including an antenna coupled to each of said first plurality of Earth-based communication stations, said antenna of a particular one of said first plurality of Earth-based communication stations being oriented to communicate with a plurality of said satellites in said first plurality of satellites, said particular Earth-based communication station communicating with a selected satellite of said first plurality of satellites selected based on a communication traffic load in said plurality of satellites in said first plurality of satellites.

8. The system of claim 1 wherein said first and second pluralities of satellites are in low-Earth orbits.

9. The system of claim 1 wherein said plurality of orbital planes are inclined at substantially 90° with respect to the Earth's equator, whereby said first and second pluralities of satellites are in near-polar orbits.

10. A system for sharing a radio frequency spectrum between first and second satellite communication systems, the system comprising:
    a first Earth-based communication station operating as an Earth-bound portion of the first satellite communication system;

a second Earth-based communication station operating as an Earth-bound portion of the second satellite communication system;

first and second satellites in a non-geostationary Earth orbit and operating as a satellite portion of the first satellite communication system to communicate with said first Earth-based communication station, said first and second satellites being in an Earth orbit in a first predetermined plane; and a third satellite in a non-geostationary Earth orbit and operating as a satellite portion of the second satellite communication system to communicate with said second Earth-based communication station, said third satellite being in an Earth orbit in said first predetermined plane and positioned intermediate said first and second satellites in said first predetermined plane.

11. The system of claim 10 wherein said first, second and third satellites are in low-Earth orbits.

12. The system of claim 10 wherein said Earth orbits are inclined at substantially 90° with respect to the Earth's equator, whereby said first, second and third satellites are in near-polar orbits.

13. The system of claim 10, further including a directional antenna coupled to said first satellite, said antenna being oriented to transmit radio frequency signals from said first satellite to said first Earth-based communication station and thereby reduce transmission of radio frequency signals from said first satellite to said second Earth-based communication station.

14. The system of claim 10, further including a directional antenna coupled to said first Earth-based communication station and oriented to transmit radio frequency signals from said first Earth-based communication station to said first satellite and thereby reduce transmission of radio frequency signals from said first Earth-based communication station received by said third satellite.

15. The system of claim 10, further including:

a fourth satellite in a non-geostationary Earth orbit in a second predetermined plane different from said first predetermined plane and operating as a portion of said satellite portion of the first satellite communication system to communicate with said first Earth-based communication station; and a directional antenna coupled to said first Earth-based communication station and oriented to communicate with said first and fourth satellites, said first Earth-based communication station communicating with a selected one of said first and fourth satellites based on a topocentric separation between said first and fourth satellites and a topocentric separation between said third and fourth satellites.

16. The system of claim 15 wherein said selected one of said first and fourth satellites having a minimum acceptable topocentric separation from said third satellite is selected for communication with said first Earth-based communication station.

17. The system of claim 10, further including:

a fourth satellite in a non-geostationary Earth orbit in a second predetermined plane different from said first predetermined plane and operating as a portion of said satellite portion of the first satellite communication system to communicate with said first Earth-based communication station; and a directional antenna coupled to said first Earth-based communication station and oriented to communicate with said first and fourth satellites, said first Earth-based communication station communicating with a selected one of said first and fourth satellites based on a lowest slant range.

18. The system of claim 10, further including:

a fourth satellite in a non-geostationary Earth orbit in a second predetermined plane different from said first predetermined plane and operating as a portion of said satellite portion of the first satellite communication system to communicate with said first Earth-based communication station; and a directional antenna coupled to said first Earth-based communication station and oriented to communicate with said first and fourth satellites, said first Earth-based communication station communicating with a selected one of said first and fourth satellites based on a communication traffic load in said first and fourth satellites.

19. A system for sharing a radio frequency spectrum in a satellite communication system, the system comprising:

first and second Earth-based communication stations operating as an Earth-bound portion of the satellite communication system;

first and second satellites each in a non-geostationary Earth orbit and operating as a satellite portion of the satellite communication system, said first and second satellites being in an Earth orbit in a first predetermined orbital plane and configured to communicate with said first Earth-based communication station; and a third satellite in a non-geostationary Earth orbit and operating as a satellite portion of the satellite communication system to communicate with said second Earth-based communication station, said third satellite being in an Earth orbit in said first predetermined orbital plane and positioned intermediate said first and second satellites in said first predetermined orbital plane.

20. The system of claim 19 wherein said Earth orbits are inclined at substantially 90° with respect to the Earth's equator, whereby said first, second and third satellites are in near-polar orbits.

21. A system for sharing a radio frequency spectrum between first and second satellite communication systems, the system comprising:

a first Earth-based communication station operating as an Earth-bound portion of the first satellite communication system;

a second Earth-based communication station operating as an Earth-bound portion of the second satellite communication system;

a first plurality of satellites in non-geostationary Earth orbits and operating as a satellite portion of the first satellite communication system to communicate with said first Earth-based communication station, each of said satellites of said first plurality of satellites orbiting the Earth in one of a first plurality of orbital planes; and a second plurality of satellites in non-geostationary Earth orbits and operating as a satellite portion of the second satellite communication system to communicate with said second Earth-based communication station, a portion of said satellites of said second plurality of satellites orbiting the Earth in one of a second plurality of orbital planes different from said first plurality of orbital planes, each of said second plurality of orbital planes being located interleaved with said first plurality of orbital planes, at least one of said second plurality of satellites being positioned intermediate two adjacent ones of said first plurality of satellites in a selected one of said first plurality of orbital planes.

22. The system of claim 21 wherein said first and second pluralities of satellites are in low-Earth orbits.

23. The system of claim 21 wherein said first and second pluralities of orbital planes are inclined at substantially 90° with respect to the Earth's equator, whereby said first and second pluralities of satellites are in near-polar orbits.

24. A system for sharing a radio frequency spectrum between a plurality of satellite communication systems, the system comprising:
   an Earth-based communication station for each of the plurality of satellite communication systems and operating as an Earth-bound portion of the respective satellite communication system;
   a set of orbital planes shared by the plurality of satellite communications systems; and
   a satellite for each of the respective satellite communication operating as a satellite portion of the respective satellite communication system to communicate with said Earth-based communication station corresponding to the respective satellite communication system, said satellites each being in a non-geostationary Earth orbit and interleaved in an ordered repetitive sequence in each of said set of orbital planes.

25. A method for sharing a radio frequency spectrum between first and second satellite communication systems, the method comprising the steps of:
   operating a first plurality of Earth-based communication stations as an Earth-bound portion of the first satellite communication system;
   operating a second plurality of Earth-based communication stations as an Earth-bound portion of the second satellite communication system;
   operating a first plurality of satellites in non-geostationary Earth orbits as a satellite portion of the first satellite communication system to communicate with said first plurality of Earth-based communication stations, each of said satellites of said first plurality of satellites orbiting the Earth in a first orbital plane; and
   operating a second plurality of satellites in non-geostationary Earth orbits as a satellite portion of the second satellite communication system to communicate with said second plurality of Earth-based communication stations, each of said satellites of said second plurality of satellites orbiting the Earth in one of said plurality of orbital planes in a position intermediate adjacent ones of said satellites of said first plurality of satellites such that each of said orbital planes contains alternating ones of said first and second plurality of satellites.

26. The method of claim 25 wherein said first and second pluralities of satellites are in low-Earth orbits.

27. The method of claim 25 wherein said plurality of orbital planes are inclined at substantially 90° with respect to the Earth's equator, whereby said first and second pluralities of satellites are in near-polar orbits.

28. A method for sharing a radio frequency spectrum between first and second satellite communication systems, the method comprising the steps of:
   operating a first Earth-based communication station as an Earth-bound portion of the first satellite communication system;
   operating a second Earth-based communication station as an Earth-bound portion of the second satellite communication system;
   operating first and second satellites in a non-geostationary Earth orbit as a satellite portion of the first satellite communication system to communicate with said first Earth-based communication station, said first and second satellites being placed in a first Earth orbit having a first predetermined plane; and
   operating a third satellite in a non-geostationary Earth orbit as a satellite portion of the second satellite communication system to communicate with said second Earth-based communication station, said third satellite being placed in an Earth orbit in said first predetermined plane and positioned intermediate said first and second satellites in said first orbital plane.

29. The method of claim 26 wherein said first, second and third satellites are in low-Earth orbits in said first orbital plane.

30. The method of claim 26 wherein said first orbital plane is inclined at substantially 90° with respect to the Earth's equator, whereby said first, second and third satellites are in near-polar orbits in said first orbital plane.

31. The method of claim 28 for use with a fourth satellite in a non-geostationary Earth orbit and operating as a portion of said satellite portion of the first satellite communication system to communicate with said first Earth-based communication station, said fourth satellite being placed in an Earth orbit in a second predetermined plane different from said first predetermined plane, the method further including the step of selecting said first or fourth satellite for communication with said first Earth-based communication station based on a topocentric separation between said first and fourth satellites and a topocentric separation between said third and fourth satellites.

32. The method of claim 31 wherein said step of selecting selects one of said first and fourth satellites having a minimum acceptable topocentric separation from said third satellite.

33. The method of claim 28 for use with a fourth satellite in a non-geostationary Earth orbit and operating as a portion of said satellite portion of the first satellite communication system to communicate with said first Earth-based communication station, said fourth satellite being placed in an Earth orbit in a second predetermined plane different from said first predetermined plane, the method further including the step of selecting said first or fourth satellite for communication with said first Earth-based communication station based on a lowest slant range.

34. The method of claim 28 for use with a fourth satellite in a non-geostationary Earth orbit and operating as a portion of said satellite portion of the first satellite communication system to communicate with said first Earth-based communication station, said fourth satellite being placed in an Earth orbit in a second predetermined plane different from said first predetermined plane, the method further including the step of selecting said first or fourth satellite for communication with said first Earth-based communication station based on a communications traffic load in said first and fourth satellites.

35. A method for sharing a radio frequency spectrum in a satellite communication system, the method comprising the steps of:
   operating first and second Earth-based communication stations as an Earth-bound portion of the satellite communication system;
   operating first and second satellites, each in a non-geostationary Earth orbit, as a satellite portion of the satellite communication system, said first and second satellites being in an Earth orbit in a first predetermined plane and communicating with said first Earth-based communication station; and operating a third satellite in a non-geostationary Earth orbit as a satellite portion of the satellite communication system to communicate with said second Earth-based communication station, said third satellite being in an Earth orbit in said first predetermined plane and positioned intermediate said first and second satellites in said first predetermined plane.

36. A method for sharing a radio frequency spectrum between first and second satellite communication systems, the method comprising the steps of:

operating a first Earth-based communication station as an Earth-bound portion of the first satellite communication system;

operating a second Earth-based communication station as an Earth-bound portion of the second satellite communication system;

inserting a first satellite into a non-geostationary Earth orbit in a first predetermined orbital plane as a satellite portion of the first satellite communication system to communicate with said first Earth-based communication station;

inserting a second satellite into a non-geostationary Earth orbit in said first predetermined orbital plane as a portion of said satellite portion of the first satellite communication system to communicate with said first Earth-based communication station;

inserting a third satellite into a non-geostationary Earth orbit in said first predetermined plane as a satellite portion of the second satellite communication system to communicate with said second Earth-based communication station; and positioning said third satellite intermediate said first and second satellites in said first predetermined plane, the first and second satellite communication systems is minimized by said first, second and third satellites in said first predetermined plane.

37. The method of claim 36 wherein said non-geostationary Earth orbits of said first, second, and third satellites are low-Earth orbits and said steps of inserting said first, second and third satellites includes insertion of said first, second and third satellites into said low-Earth orbits in said first predetermined plane.

38. The method of claim 36 wherein said non-geostationary Earth orbits of said first, second, and third satellites are inclined at substantially 90° with respect to the Earth's equator and said steps of inserting said first, second and third satellites includes insertion of said first, second and third satellites into said first predetermined orbital plane such that said first, second and third satellites are in near-polar orbits in said first predetermined orbital plane.

39. The method of claim 36, further including the steps of inserting a fourth satellite into a non-geostationary Earth orbit in a second predetermined plane different from said first predetermined orbital plane for operation as a portion of said satellite portion of the first satellite communication system to communicate with said first Earth-based communication station, and selecting said first or fourth satellite for communication with said first Earth-based communication station based on a topocentric separation between said first and fourth satellites and a topocentric separation between said third and fourth satellites.

40. The method of claim 39 wherein said step of selecting selects one of said first and fourth satellites having a minimum acceptable topocentric separation from said third satellite.

41. The method of claim 36, further including the steps of inserting a fourth satellite into a non-geostationary Earth orbit in a second predetermined plane different from said first predetermined orbital plane for operation as a portion of said satellite portion of the first satellite communication system to communicate with said first Earth-based communication station, and selecting said first or fourth satellite for communication with said first Earth-based communication station based on a lowest slant range.

42. The method of claim 36, further including the steps of inserting a fourth satellite into a non-geostationary Earth orbit in a second predetermined plane different from said first predetermined orbital plane for operation as a portion of said satellite portion of the first satellite communication system to communicate with said first Earth-based communication station, and selecting said first or fourth satellite for communication with said first Earth-based communication station based on a communication traffic load in said first and fourth satellites.

* * * * *